(12) United States Patent
Brynolf et al.

(10) Patent No.: US 6,796,793 B2
(45) Date of Patent: Sep. 28, 2004

(54) BURNER ASSEMBLY HAVING A DETACHABLY COUPLED FLAME JET FORMING RING

(76) Inventors: Russell Brynolf, 1845 Nikki Ct., Howell, MI (US) 48843; Michael D. Elberson, 15275 Gebhardt Rd., Elm Grove, WI (US) 53122

( * ) Notice: Subject to any disclaimer, the term of this patent is extended or adjusted under 35 U.S.C. 154(b) by 336 days.

(21) Appl. No.: 10/107,849

(22) Filed: Mar. 27, 2002

(65) Prior Publication Data

US 2002/0179224 A1 Dec. 5, 2002

Related U.S. Application Data

(63) Continuation-in-part of application No. 09/836,659, filed on Apr. 17, 2001, now Pat. No. 6,582,773.

(51) Int. Cl.[7] .................................................. B05B 7/16
(52) U.S. Cl. .................... 431/328; 118/47; 118/300; 118/302; 118/313; 118/315; 118/323; 427/226; 427/227; 427/421; 427/422
(58) Field of Search ............................ 431/328; 118/47, 118/300, 302, 313, 315, 323; 427/226, 227, 421, 422

(56) References Cited

U.S. PATENT DOCUMENTS

| | | |
|---|---|---|
| 4,130,388 A | 12/1978 | Flanagan |
| 4,976,607 A | 12/1990 | Grimard |
| 5,753,754 A | 5/1998 | Strobel et al. |
| 6,116,893 A | 9/2000 | Peach |
| 2002/0018860 A1 | 2/2002 | Filippou et al. |
| 2003/0157268 A1 | 8/2003 | Gutowski et al. |
| 2003/0194504 A1 | 10/2003 | Bilyk et al. |

FOREIGN PATENT DOCUMENTS

| | | |
|---|---|---|
| WO | WO 01/29118 A1 | 4/2001 |
| WO | WO 01/56756 A1 | 9/2001 |
| WO | WO 02/04552 A1 | 1/2002 |

Primary Examiner—Bernard Pianalto
(74) Attorney, Agent, or Firm—Welsh & Katz, Ltd.

(57) ABSTRACT

A method and device of treating an irregularly shaped article to prepare the article for painting is provided. The device includes a burner which can produce an adjustable flame tongue which can fit into crevices, openings and other irregular topographical features of an item to be painted or otherwise coated. The burner device further provides means to apply a grafting chemical on a freshly oxidized surface. Further, the invention provides means to colorize treated objects so that they may be recognized as having been treated. In another embodiment, the grafting chemicals may be enhanced with electrolytic solutions such that electrostatic methods of painting may be subsequently employed on the item. In an alternate embodiment, the burner is adapted to spray a powder inside of a generally enclosed flame, and is used in conjunction with chop guns to manufacture glass or carbon fiber preforms. In a preferred embodiment all of the main systems of the present invention are provided with redundancies that allow the continuous operation of the device. Further, the device provides means to run and modify the process either locally or by remote communication means.

17 Claims, 26 Drawing Sheets

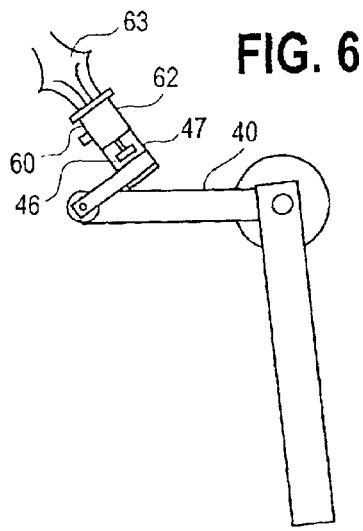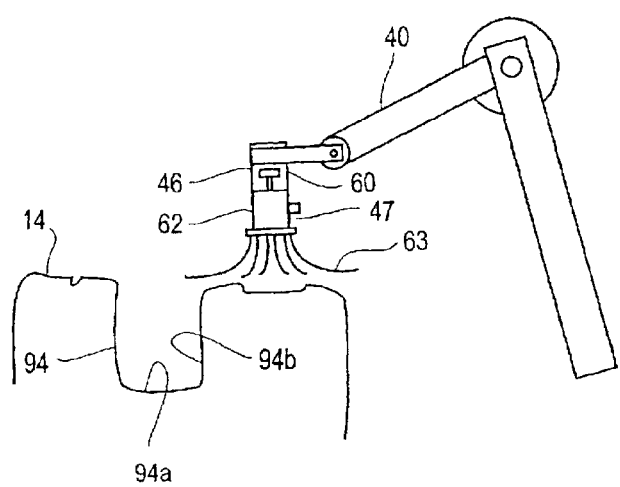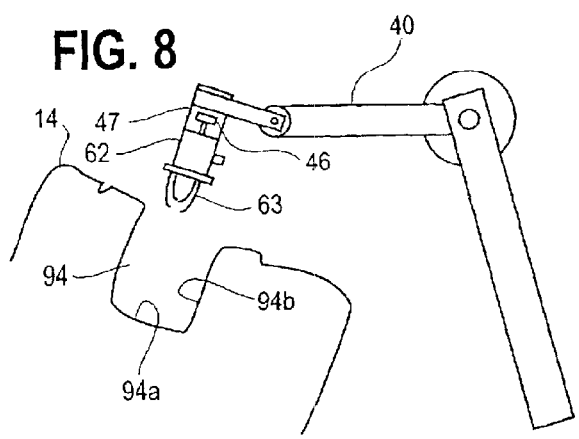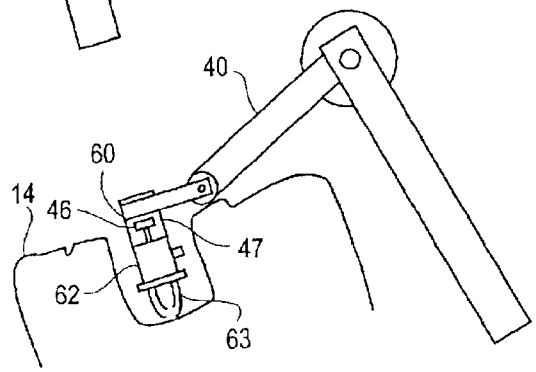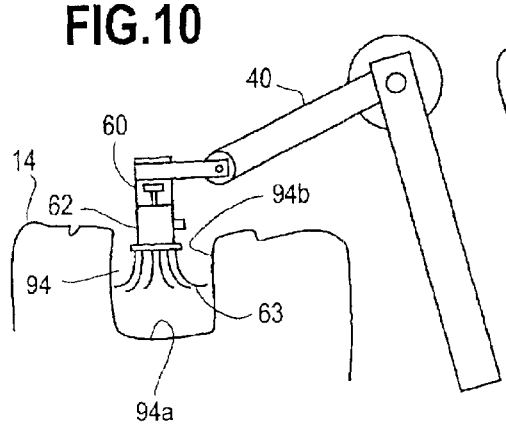

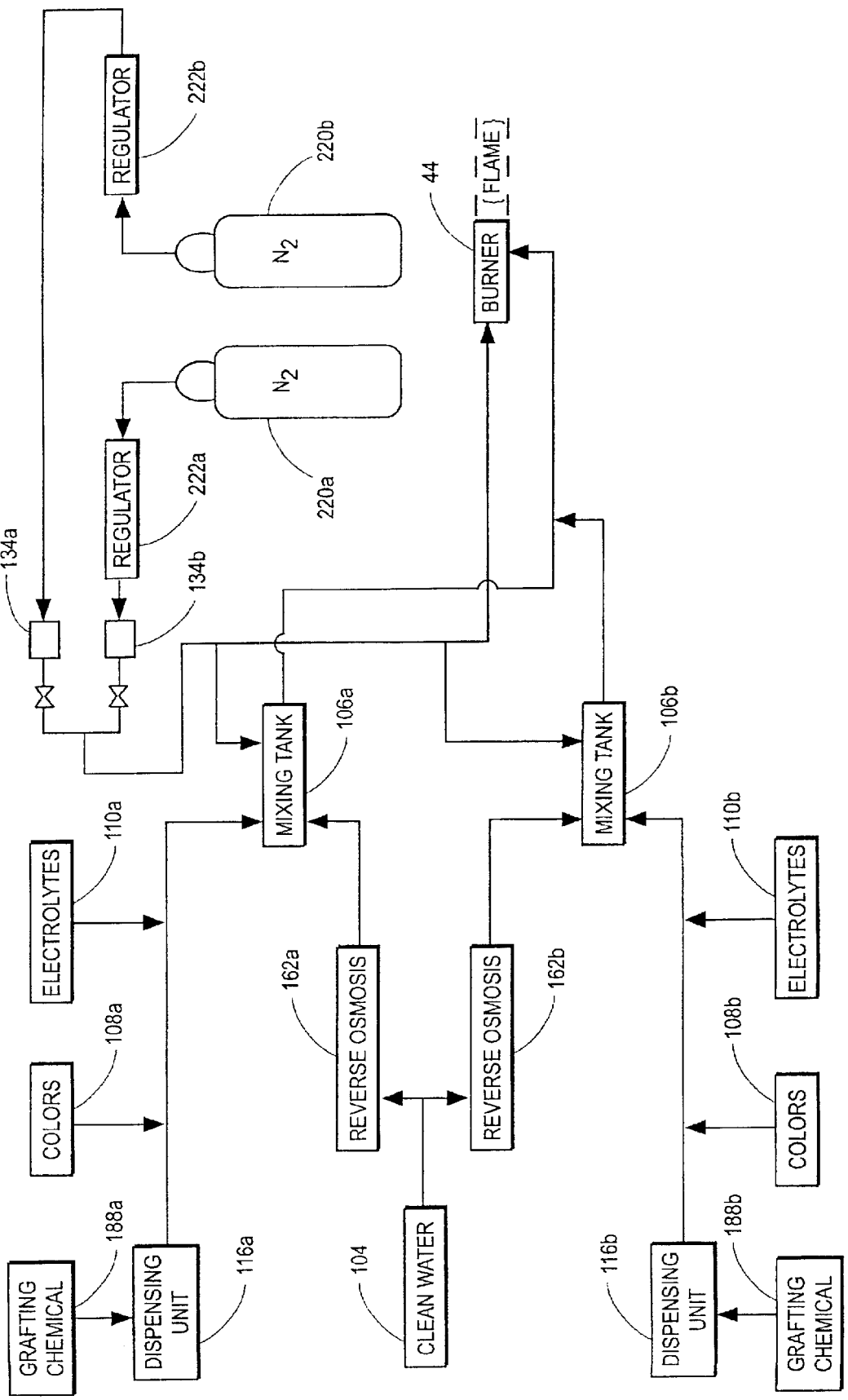

PLAQUE TEST DATA
(PROCESS WINDOW) DOE

FIG. 22

| TEST REPORT NUMBER | | 30 | | | |
|---|---|---|---|---|---|
| | | | | | |

MATERIAL    SOLVAY   SG6501   NATURAL   REACTOR GRADE    INITIAL SE LEVEL    <32 DYNES

| PROGRAM # | | | SPEED | MOVJ = 15 | | |
| DATE | | 25TH FEB 2002 | | | TESTER /S  R. BRYNOLF | |
| OBJECTIVE | | | | | | |

TO IDENTIFY RELATIONSHIPS (IF ANY) BETWEEN   DISTANCE   USING 3 DISTANCES  2"/3"/4"
                                             VOLUME SURFACE VELOCITY ?   MIN OF 300 L/MIN - INCREASED 50 L/MIN
                                             OXYGEN CONTENT TREATMENT LEVEL ?   USING 3 - % CONTENTS  0.2/ 1.0 /2.1

TO QUANTIFY THE PROCESSING WINDOWS GIVEN CERTAIN OPERATIONAL CRITERIA

| PART 1 | | | PART 2 OXYGEN % 0.20% | | PART 3 OXYGEN % 1.00% | | PART 4 OXYGEN % 2.10% | |
|---|---|---|---|---|---|---|---|---|
| DISTANCE IN " | AIR VOLUME IN L/MIN | SURFACE VELOCITY IN FT/MIN | GAS VOLUME L/MIN | SE LEVEL DYNES | GAS VOLUME L/MIN | SE LEVEL DYNES | GAS VOLUME L/MIN | SE LEVEL DYNES |
| 2 | 300 | 740 | | 60+ | | 58 | | |
|   | 387 | 960 | | | | | | |
|   | 400 | 1000 | | 57 | 15 | 60+ | | |
|   | 450 | 1130 | | | | | | |
|   | 500 | 1260 | | 54 | 19 | 60+ | | |
|   | 550 | 1400 | | | | | | |
|   | 600 | 1540 | | 52 | 21 | 60+ | | |
| 3 | 300 | 540 | | 44 | | 38 | | |
|   | 387 | 710 | | | | | | |
|   | 400 | 730 | | 57 | 15 | 46 | | |
|   | 450 | 830 | | | | | | |
|   | 500 | 930 | | 58 | 19 | 54 | | |
|   | 550 | 1030 | | | | | | |
|   | 600 | 1130 | | 60 | 21 | 58 | | 52 |
| 4 | 300 | 660 | | 42 | | 44 | | |
|   | 387 | 850 | | | | | | |
|   | 400 | 880 | | 46 | 15 | 45 | | |
|   | 450 | 1000 | | | | | | |
|   | 500 | 1110 | | 52 | 19 | 46 | | |
|   | 550 | 1220 | | | | | | |
|   | 600 | 1340 | | 54 | 21 | 50 | | 48 |

PLAQUE TEST DATA (PROCESS WINDOW) DOE
OXYGEN CONTENT 0.2%

|  | SURFACE VELOCITY 2" | SURFACE VELOCITY 3" | SURFACE VELOCITY 4" |
|---|---|---|---|
| 300 | 740 | 540 | 660 |
| 400 | 1000 | 730 | 880 |
| 500 | 1260 | 930 | 1110 |
| 600 | 1540 | 1130 | 1340 |

PLAQUE TEST DATA (PROCESS WINDOW) DOE
OXYGEN CONTENT 1.0%

|  | SURFACE VELOCITY 2" | SURFACE VELOCITY 3" | SURFACE VELOCITY 4" |
|---|---|---|---|
| 300 | 740 | 540 | 660 |
| 400 | 1000 | 730 | 880 |
| 500 | 1260 | 930 | 1110 |
| 600 | 1540 | 1130 | 1340 |

BURNER ASSEMBLY HAVING A DETACHABLY COUPLED FLAME JET FORMING RING

This application is a continuation-in-part of U.S. patent application Ser. No. 09/836,659, filed on Apr. 17, 2001, now U.S. Pat. No. 6,582,773.

FIELD OF THE INVENTION

The present invention generally relates to methods and apparatus' for treating plastic substrate parts to accept paint and, more particularly, to a method and apparatus for treating plastic substrate parts to accept paint without using adhesion promoters that allows, for example, plastic substrate parts having flat regions, undulations, and recesses to be properly treated.

BACKGROUND OF THE INVENTION

In the art and science of painting, it is a practice to prepare a surface that is to be painted to receive paint. A surface properly prepared is more likely to produce a desirable result and remain properly painted for a long term. Preparation techniques vary depending on the material to be painted, the type of primer, stain and/or paint which will be used, the manner of application of the paint and the conditions to which the painted item will be subjected, among others.

In the past, with respect to automobiles and automobile parts, plastic played a minor role and typically could be prepared such that the plastic part was molded in the desired color. As plastic has become a more important product in the automobile industry, such items as interior and exterior doors, dashboards and other body panels and protective equipment, such as bumpers and door guards, have been made of a plastic material. Typically, exterior plastic parts, especially in modern vehicles, are painted to match or aesthetically contrast, with the body of the automobile.

In order to speed production of parts, and reduce costs, plastic parts are now typically molded in one color (such that only a single run of molding is needed for all colors offered in a vehicle model) and then painted to match the desired vehicle color. This allows for less planning and more availability of parts for all colors of a vehicle model, and typically greater numbers of color combinations to appeal to the tastes of purchasers. Further, this manner of producing parts allows an adequate supply of replacement parts for subsequent body repair needs on any color vehicle.

A problem arises, however, in producing painted parts, in that the plastic materials, used as body parts, typically must have a smooth surface in order to be acceptable. Smooth surfaces are typically not amenable to painting. Paint sprayed, or otherwise placed, on smooth surfaces, especially those with low surface energies, generally does not stick to the surface and may be peeled or chipped off, which is a highly commercially undesirable result. While various means have been provided to stem this problem, such as abrading the surface prior to painting or adding adhesives, such as epoxy, to paint, in order to get the paint to stick to the item being painted, none of these has proved effective.

It has been found that the use of a grafting material, such as those in a family of multifunctional amine-containing organic compounds, on plastic parts, which have been oxidized, allows paint to better adhere to the plastic. See, for example, U.S. Pat. No. 5,922,161 to Wu et al. (the "'161 patent") that discloses a method of modifying or tailoring the surface of polymers and or polymer-based materials to control surface and interface chemistry and molecular structure. The '161 patent discloses a method for oxidizing the surface of a polymer and treating the surface with a grafting chemical. The content of the '161 patent is incorporated by reference into this application as if fully set forth herein.

It has been found, however, procedures which employ the use of grafting chemicals added to plastic parts which have been oxidized are typically only generally applicable to sheets of plastic. Further, there is a potential for the devices and methods used to oxidize the plastic and apply the chemicals to sheets of plastic typically do so in such manner as to cause areas of the plastic sheet to be treated more than once, because of inadvertent overlapping, wasting chemicals, causing the loss of production time and potential cohesive weakening in the over treated areas.

In one plastic sheet treating operation, a gas/air burner, having a large area with many burner ports is used. The burner device is moved over the plastic sheet, overlapping some sections of the sheet in movement. In the operation of such a system, the burner oxidizes the plastic sheet, and then a grafting chemical is sprayed onto the oxidized plastic, to prepare the plastic for further processing, such as with paint, adhesives or other coatings. The sheet is thereby made amenable to adhesion by other chemicals, including paint.

However, plastic parts typically are not made in the form of plastic sheets, especially in automobile applications. Plastic parts are generally constructed in all shapes and with undulations, indentations, openings, crevices and other contours. The use of such treatment devices and methods, as described above, are ineffective to treat the variations in modern plastic parts. Further, treatments such as dipping or spraying have been found to be ineffective as the oxidation process cannot pre-treat the non-linear sections of the plastic part, causing the sprayed grafted material to be wasted.

Further, it has been found that the use of prior treating apparatus often cause large number of toxic chemicals to be released into the atmosphere as a result of the shot-gun approach to the treatment of plastics. This is especially the case when adhesion promoters are utilized to prepare a plastic substrate part to accept paint.

Another problem that exists in present plastic part treatment methods is that once the part is treated it is typically difficult, without sophisticated tests, to discern a difference between the treated part and an untreated part. In many instances, items that have been treated have been confused with items which have not been treated, causing a waste of materials and time in retreating, and, generally, an over weakening of the surface of the part which is re-treated.

Another problem has occurred in that in a typical system used in any field where a supply of chemicals must be mixed and propelled, there is a tendency for machinery to break down and/or need general maintenance, during a work cycle, so that it can work nominally and continuously. Typically, a chemical application system must be shut down for repair or so that chemicals or other components can be replenished or so that normal maintenance can be completed, stopping production while the system is being replenished, repaired or maintained.

SUMMARY OF THE INVENTION

I have discovered and invented a method and apparatus for treating plastic substrate parts to accept paint without using adhesion promoters that allows all undulations, indentations, openings, crevices and other contours in the plastic substrate parts to be effectively treated. In accordance with one aspect of my invention, I have designed a unique burner device that allows a desired portion of a substrate plastic part to be flame treated and sprayed with a graft chemical at substantially the same time thereby allowing adhesion of paint, or other coatings, to the part.

Such a method and apparatus has a number of distinct advantages. First, plastic substrate parts of all shapes and sizes can be prepared to accept paint. Second, the method disclosed herein is practiced in an environmentally friendly manner. For example, all of the environmentally deleterious effects associated with utilizing adhesion promoters such as, for example, the discharge of the active solvent utilized in typical compositions of adhesion promoters are completely eliminated. This allows, for example, the manufacturer's capital costs to be reduced because, for example, there is reduced need for abatement systems that reduce the discharge of solvents to the atmosphere.

Third, this method and apparatus is suitable for use in large, commercial scale applications. For example, in accordance with one embodiment of the present invention, a plastic bumper fascia can be treated to accept paint in approximately forty (40) seconds per part or less. Fourth, the use of this method and apparatus significantly reduces over-spray so that smaller amounts of graft chemicals can be utilized.

Further, the system, in one embodiment, is made such that every important component has a redundancy that allows work to proceed while refilling of required chemical components is made or repairs or maintenance is performed.

The system, further, in a preferred embodiment allows for monitoring of all system components on site and from remote locations so that the system can be monitored, repaired and/or adjusted locally or remotely.

Other objects and advantages of the present invention will become apparent as the description proceeds.

BRIEF DESCRIPTION OF THE DRAWINGS

FIG. 6 is a perspective view of the arm of a robot treatment, equipped with the burner of FIG. 3c being used on an item to be treated;

FIG. 7 is a perspective view of the arm and burner of FIG. 6 shown treating the flat portion of an item to be treated;

FIG. 8 is a perspective view of the arm and burner of FIG. 6 shown being readied to treat an indentation in an item to be treated;

FIG. 9 is a perspective view of the arm and burner of FIG. 6 shown lowered into an indentation in a first pre-treatment inter-cavity position;

FIG. 10 is a perspective view of the arm and burner of FIG. 6 shown in treating the walls of the indentation of the item to be treated;

FIG. 21 is a schematic representation of another preferred embodiment of the method of the present invention;

FIG. 22 is a chart showing test results of the use of the device and method of the present invention;

DETAILED DESCRIPTION OF AN ILLUSTRATIVE EMBODIMENT

Figure 1:
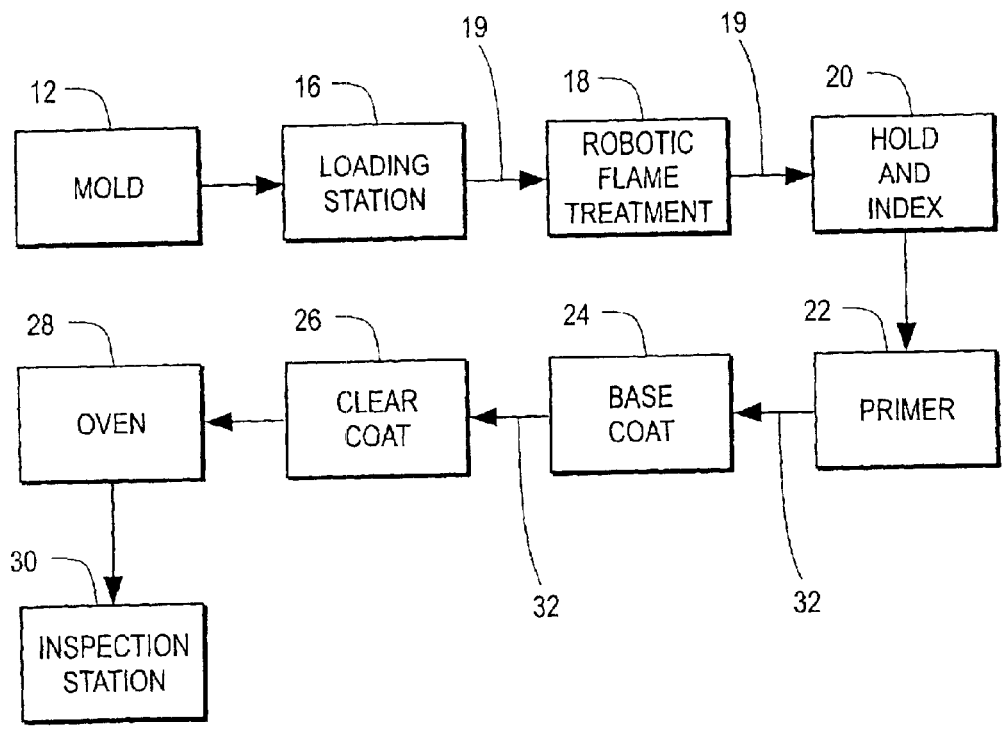
FIG. 1 is a schematic view of the method of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

Referring to the drawings, FIG. 1 shows a schematic view of one embodiment of a factory 10 utilizing the method and device of the present invention. In such a factory 10, a mold 12 may be available to actually produce an item 14 or device that will be subsequently treated and painted in factory 10. Factory 10 further comprises a loading station 16, deionized air points 19, a robotic flame treatment section 18, a hold and index station 20, a primer application station 22, a base coat station 24, a clear coat station 26, an oven 28 and an inspection station 30. Each of these station will be described, in relation to the function performed, in greater detail below.

Mold 12, in one example, comprises an injection molding apparatus that is adapted to produce a variety of plastic substrate parts (item 14) that are to be treated and then painted. In a motor vehicle application of the present invention, mold 12 is adapted to produce a variety of plastic motor vehicle components such as, for example, a bumper fascia, a body side molding, or the like. It should be understood by those skilled in the relevant art that mold 12 produces any plastic substrate part desired, irrespective of the application in which the plastic substrate part is to be utilized.

In a preferred embodiment of the factory of the present invention, a flash tunnel 32, which can utilize de-ionized air, is provided for sending item 14, for drying, between stations which provide coatings, such as the primer application station 22 and the base coat station 24. In this manner intermediate coatings are allowed to properly dry prior to the next step in the procedure. It is to be understood that the illustrated configuration of factory 10 is one of many possible configurations, and is not intended as a limitation to the scope of the present invention. It will be understood, by those having skill in the relevant art, that such stations as clear coat station 26 and base coat station 24 can be configured so that both steps can be performed, individually, at the same station in a factory.

It is to be further understood that an item 14 to be treated in factory 10 may be constructed outside of the factory, at any location or anywhere, without departing from the novel scope of the present invention. In the use of the factory, item 14, which has been molded or otherwise produced, is placed onto a loading station 16, which, without departing from the novel scope of the present invention, may be a conveyor belt or system or may be a fixed device for holding item 14. In one embodiment of the procedure, item 14 is treated with a cleansing chemical wipe and is passed through flash tunnel 32. It is to be understood that the item 14 may be treated without being chemically wiped, or may be chemically wiped without passing through a flash tunnel or using drying deionized air, without departing from the novel scope of the present invention.

Figure 2:
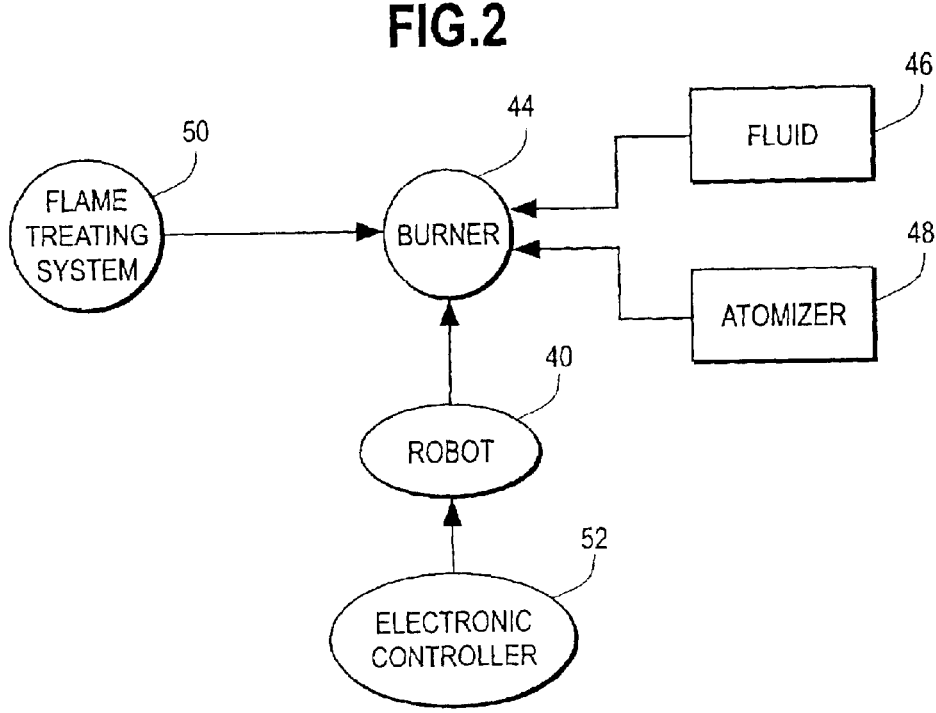
FIG. 2 is a schematic view of the operation of one embodiment of the device of the present invention.

A robotic device 40, comprising a flame treatment burner 44, as schematically shown in FIG. 2 and illustrated in FIG. 3b and FIGS. 6 through 10, traverses the length of item 14, in a manner which will be described in detail below. The treated item 14 can then be indexed, coated with primer, passed through a flash tunnel 32, painted with a base coat of paint, returned to a flash tunnel 32, and then painted with a clear coat. Subsequently, the item can be dried in an oven, or kiln, and sent to an inspection station where the results of the procedure can be inspected.

Figure 13:
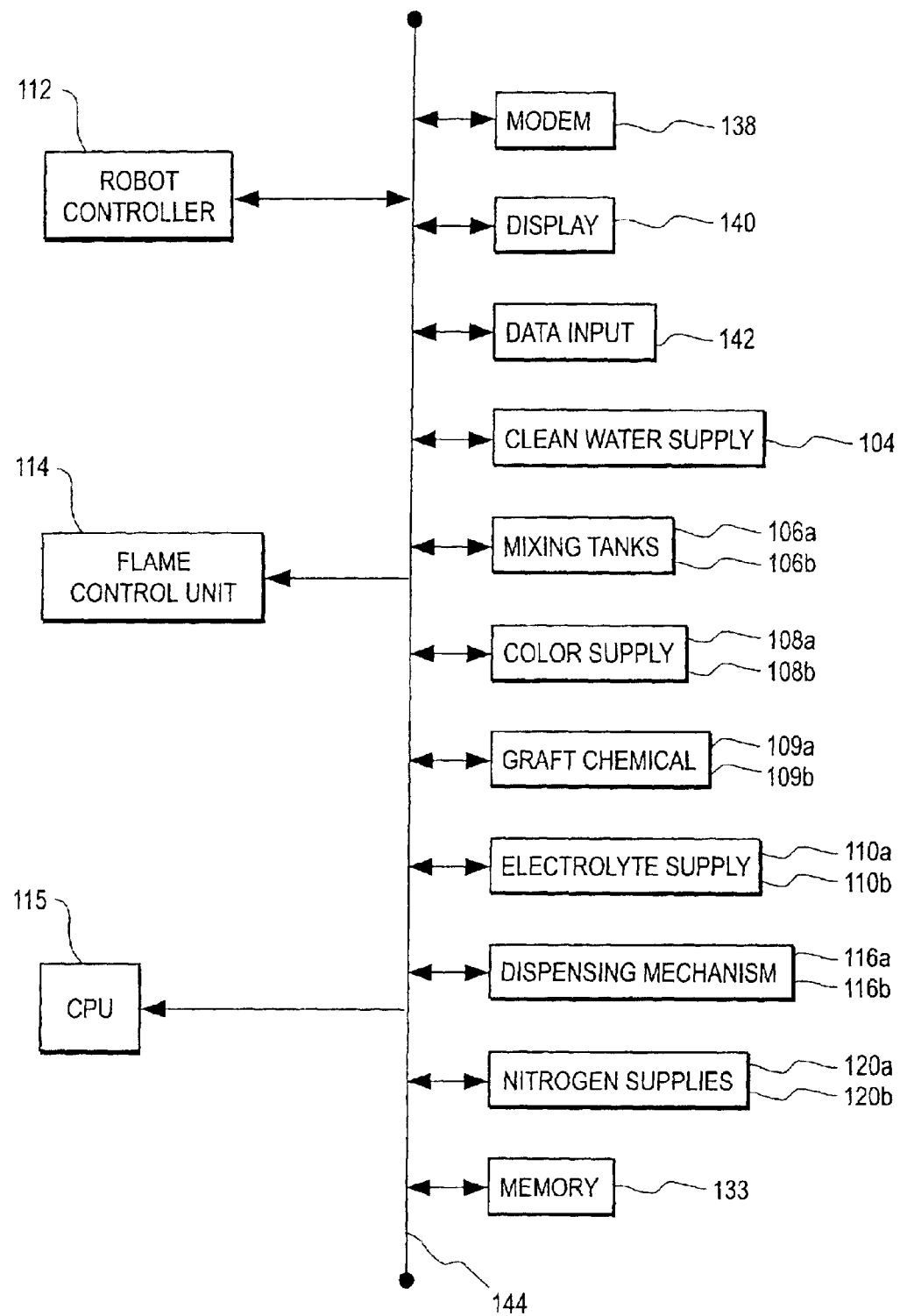
FIG. 13 is schematic representation of the control system of a preferred embodiment of a preferred embodiment of the present invention.
Figure 13A:
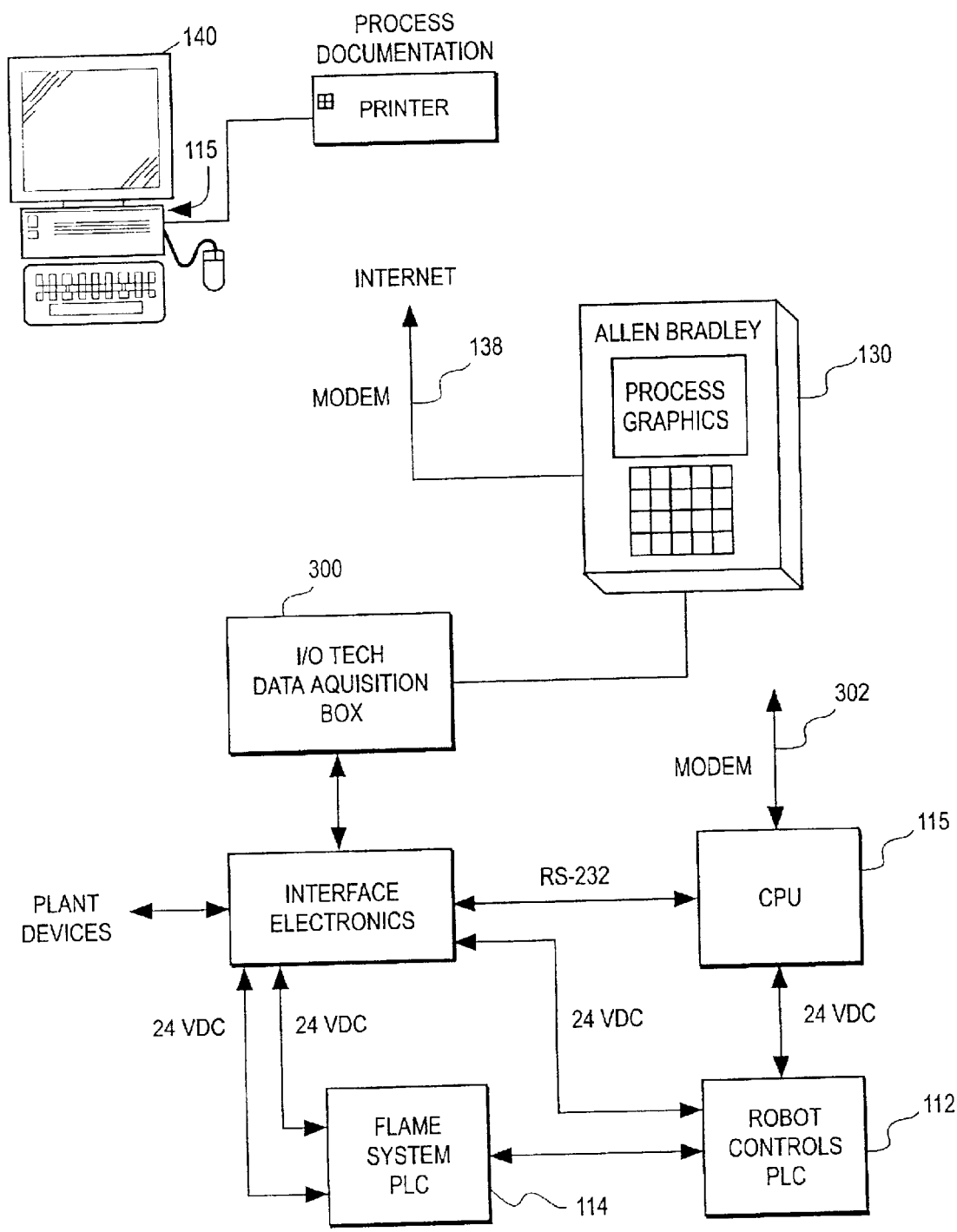
FIG. 13a is a more particular schematic representation of the control system of FIG. 13.

In a preferred embodiment, robotic device 40 generally comprises a burner 44 having fluid storage or connection means 46, a fluid atomizer 48, a flame treating system 50 and electronic control means 52, such as a computer or other processing device capable of accepting programming (shown schematically in FIGS. 13 and 13a). In the operation of the device of the present invention, a plastic item 14 is first oxidized by a flame 62 and then treated with a grafting chemical 46, in a preferred embodiment, the grafting chemical 46 is placed almost immediately onto the area that has been oxidized, as will be described in detail below.

A preferred graft chemical that is suitable for use in connection with the present invention is a polyethylenimine that is commercially available from BASF, and that is sold under the brand name of Lupaslol® G35. In accordance with the preferred embodiment of the invention, a quantity of water is mixed with a quantity of Lupaslol® G35 in a ratio of 400:1. It should be understood, however, that other graft chemicals or powders (and different ratios of the same) can be utilized in accordance with the present invention without departing from the scope thereof.

Fluid storage or connection means 46 further comprise storage and/or inlets for such fluids as grafting chemicals, colorizing chemicals, electrolytic chemicals and other chemicals as needed, as will be described in greater detail below. Referring to FIG. 3b, a perspective view of the burner 60 of the present invention is shown. It will be noticed that, in the illustrated embodiment, the flame area 62 of burner 60 is formed in a cylindrical body 61 with flame capability throughout the upper surface 64 of burner 60. It will be understood, by persons having skill in the art that the upper surface 64 of burner 60 can be constructed with a plurality of flame jets 66 (shown schematically) so as to produce and even flame about the entirety of surface 64. As illustrated in FIG. 3b, an atomized fluid ejector 68 is included generally in the center of cylindrical body 61.

It is to be understood that fluid ejector 68 may be placed in any effective and efficient area within body 61 without departing from the novel scope of the present invention. Further, it is to be understood that while a single rod atomizer tube 68 is shown, any form of fluid propulsion, including a system where pressurized gas is drawn across the top of tube to draw fluid out of a container and propel the fluid towards the item 14 to be treated, may be used without departing from the novel scope of the present invention. Such devices are utilized in outside mix air brush devices and may easily be adapted to the burner 60 of the present invention without departing from the novel scope of the present invention.

It will be seen that the burner 60 of the present invention, further comprises insertion means 54, to bring chemicals into robotic device 40. Insertion means 54 comprises means, such as valves or other input sources, for insertion of fluids 46, a valve through which a propellant 47 may be injected, and an air/gas intake inlet 49. In a preferred embodiment of the present invention the propellant 47 used is pressurized Nitrogen gas ($N_2$). It has been found that the use of the preferred propellant 47 provides the force to propel chemicals in a desired fashion while not being flammable (in the presence of flame treatment system 50) and not effecting the oxygen content of the flame in flame treatment system 50. It is to be understood that any propellant having similar properties may be employed by persons having skill in the art without departing from the novel scope of the present invention.

Figure 3A:
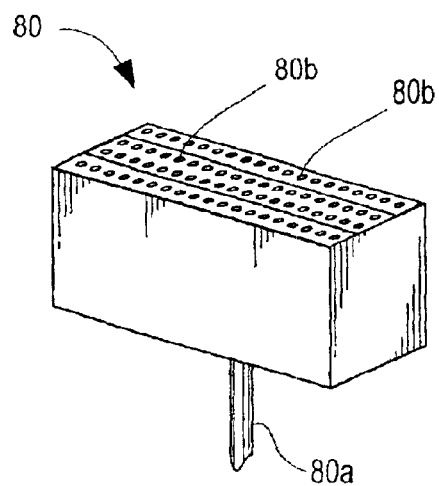
FIG. 3a is a perspective view of a burner of the prior art.
Figure 3B:
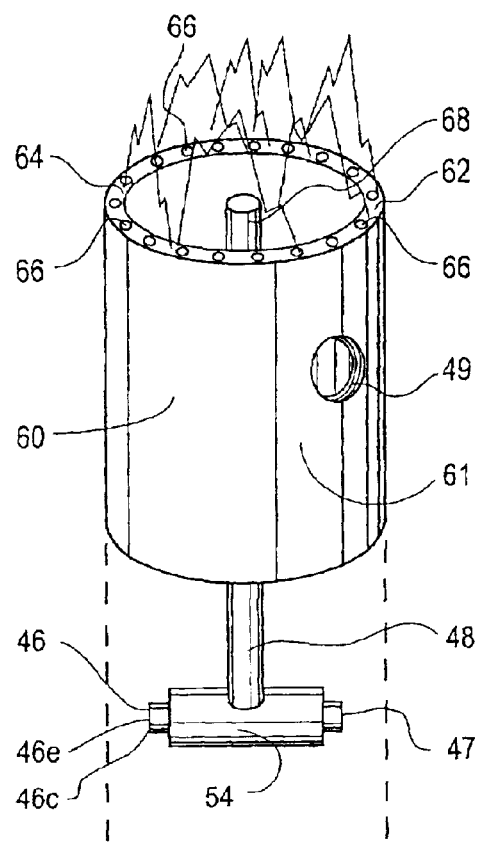
FIG. 3b is a perspective view of a burner in accordance with one embodiment of the present invention.
Figure 3C:
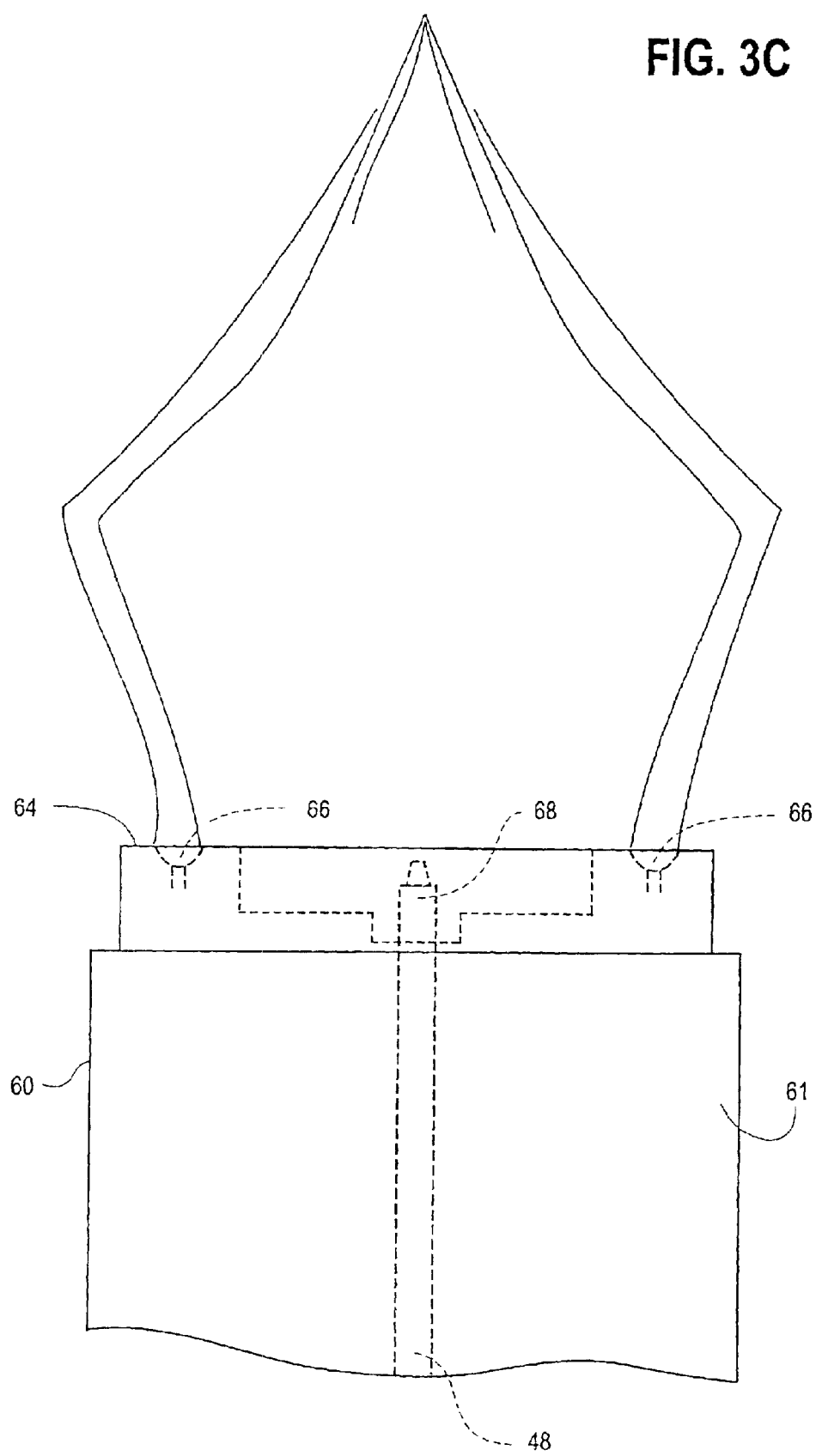
FIG. 3c is a schematic view of a burner in accordance with one embodiment of the present invention.

Referring to FIG. 3a, one example of a burner system 80 of the prior art is illustrated to allow comparison with the exemplary device of the present invention that is illustrated and disclosed in this application. It will be seen that burner system 80 includes an inlet 80A and a plurality of flame outlets 80B, and is of a flat elongated type, useful in providing surface treatment to flat sheets of materials.

Referring now to FIGS. 3c, 3d, 3e, 3f, 3g, 3h and 3i, one preferred embodiment of a burner is illustrated, along with a first and second flame jet-forming ring 66a and 66m. In the preferred embodiment, illustrated in FIGS. 3c through 3i, like numbers as those used in FIGS. 3a and 3b are used so as to relate like parts.

Figure 3D:
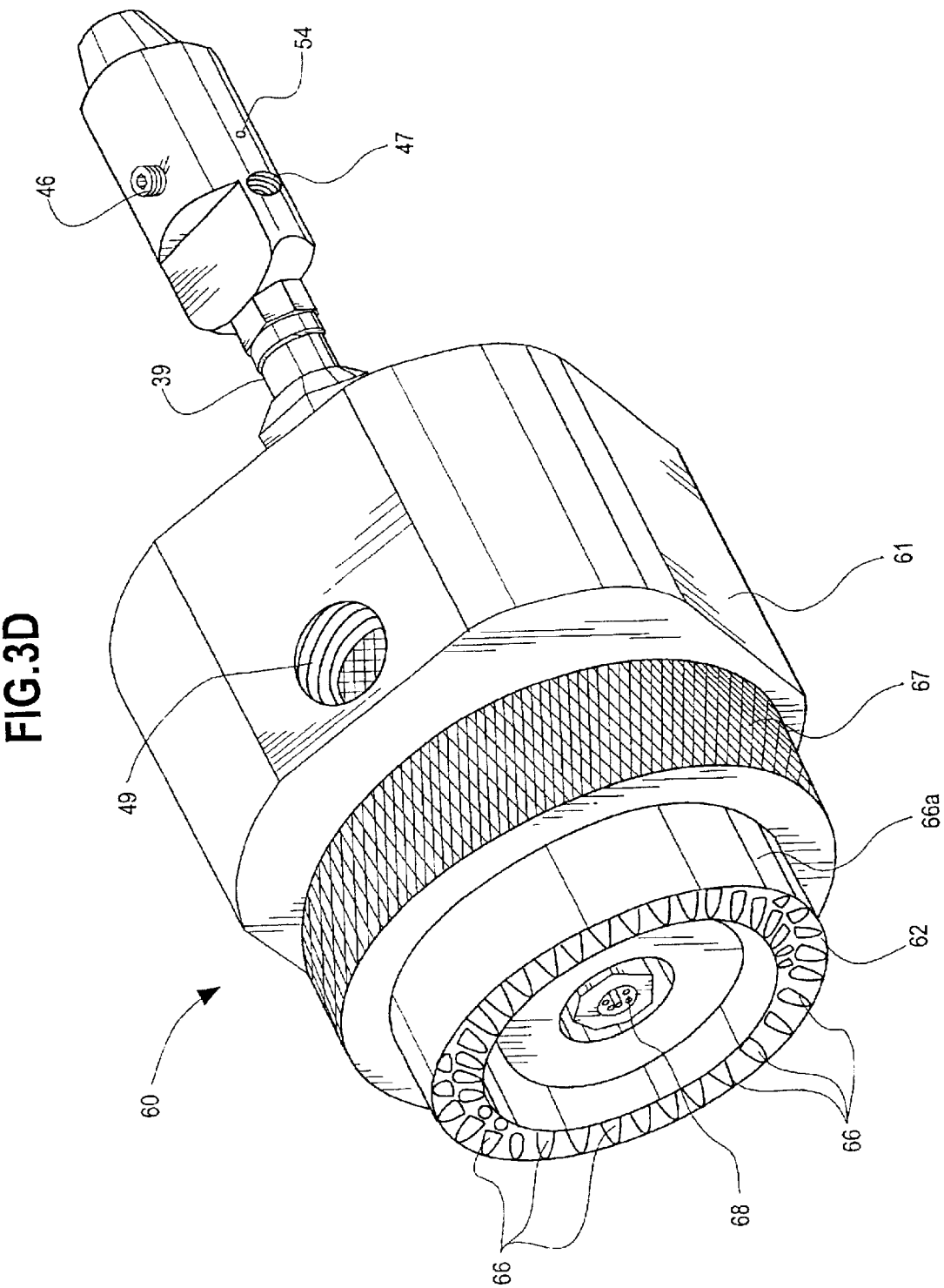
FIG. 3d is a perspective view of one preferred embodiment of the burner of the present invention.

In the construction of burner 60, of FIG. 3d, a generally cylindrical body 61 is provided having the following components, a generally circular bottom element 61a, defining an opening (not shown) through which tubular member 39 may be inserted and attached by any desired means, in a manner known by persons having skill in the art. Such connection means may include the inclusion of threads on both tubular member 48 and defined in bottom element 61a, without limiting the scope of the present invention. It will be understood that the proximal end of tubular member 39 is adapted for connection to a supply of grafting chemical and to a supply of propellant, in a manner previously described. Within cylindrical body 61 air/gas intake inlet 49 is defined. It will be understood that any manner of providing air to body 61 may be substituted without departing from the novel scope of the present invention. As shown in FIG. 3d, air/gas intake 49 is formed in body 61 in such a manner that air may be supplied through a hose and valve arrangement in a manner well known in the art. To facilitate such an arrangement, air intake 49 may be provided with any means to attach an air supply known in the art.

Figure 3E:
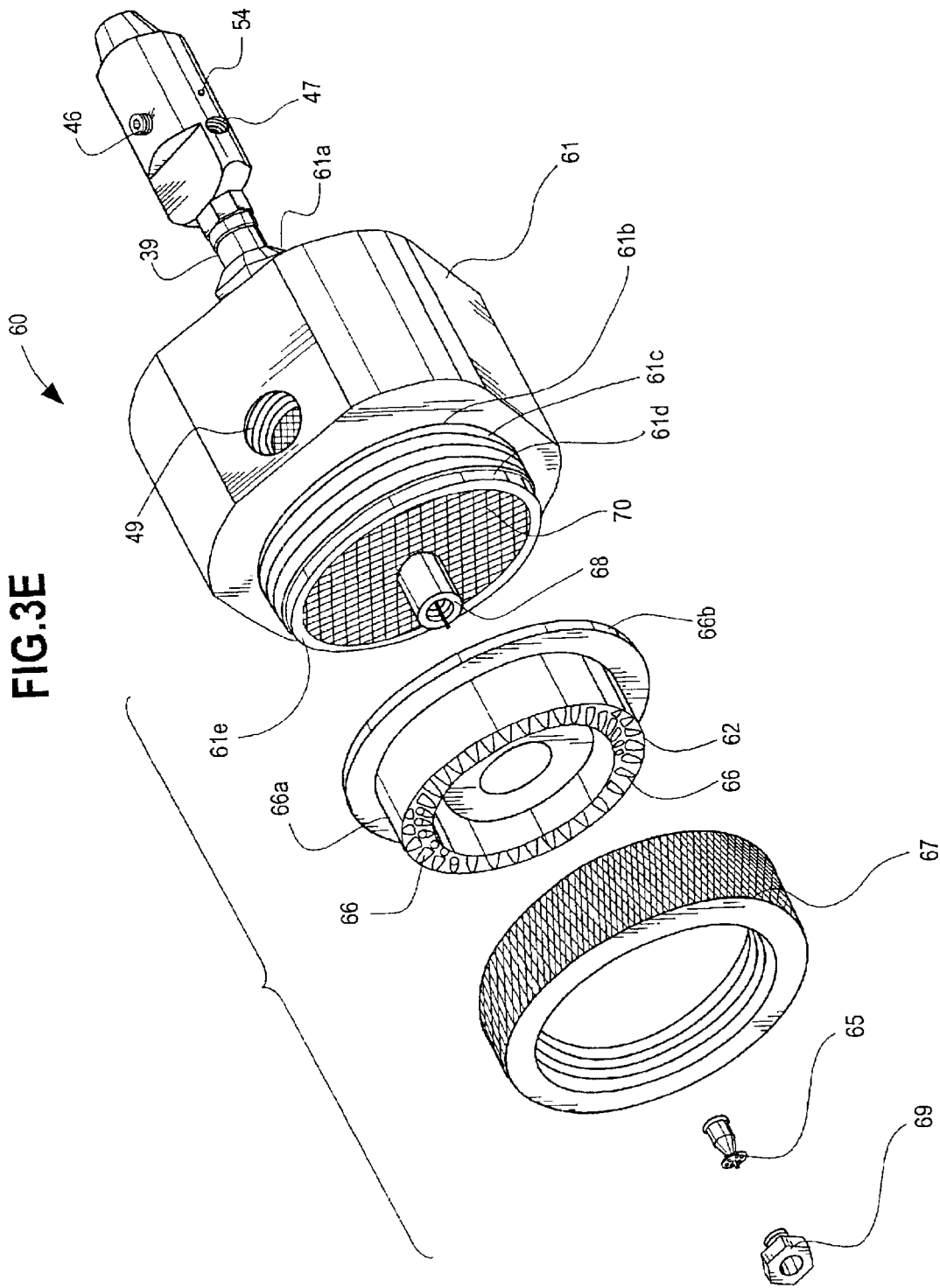
FIG. 3e is an exploded perspective view of the burner of FIG. 3d.
Figure 3F:
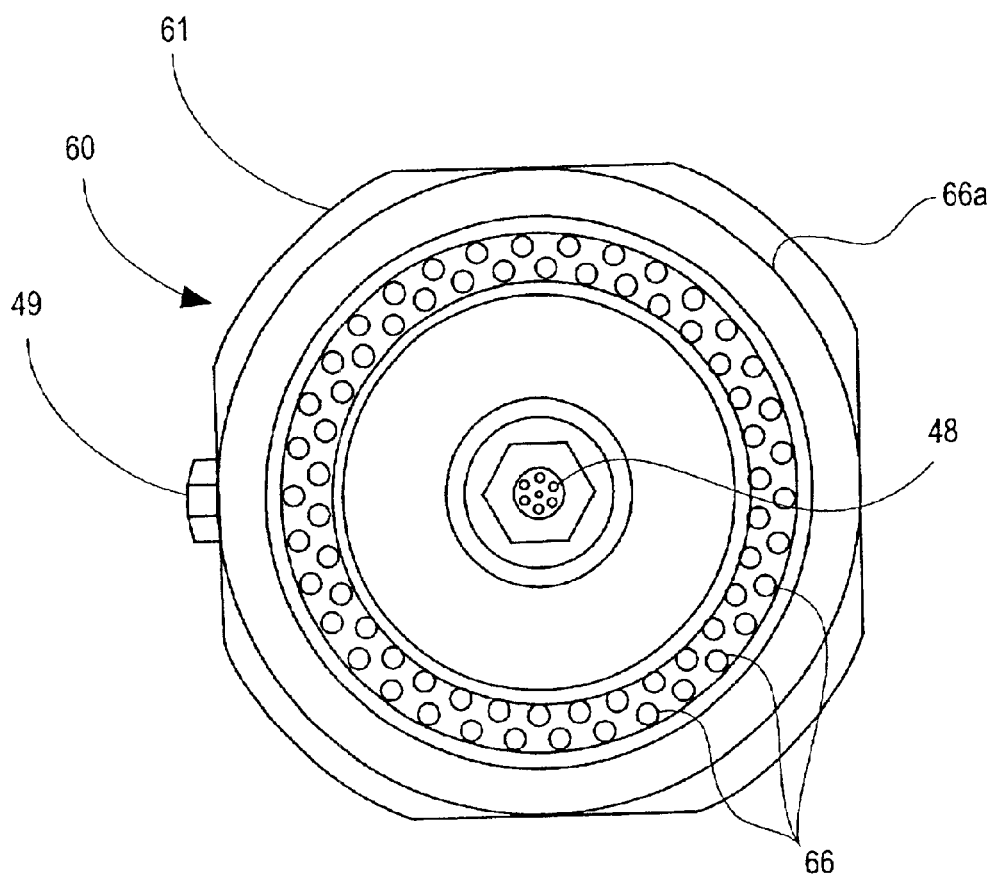
FIG. 3f is an elevational view of the distal end of the burner of FIG. 3d.
Figure 3G:
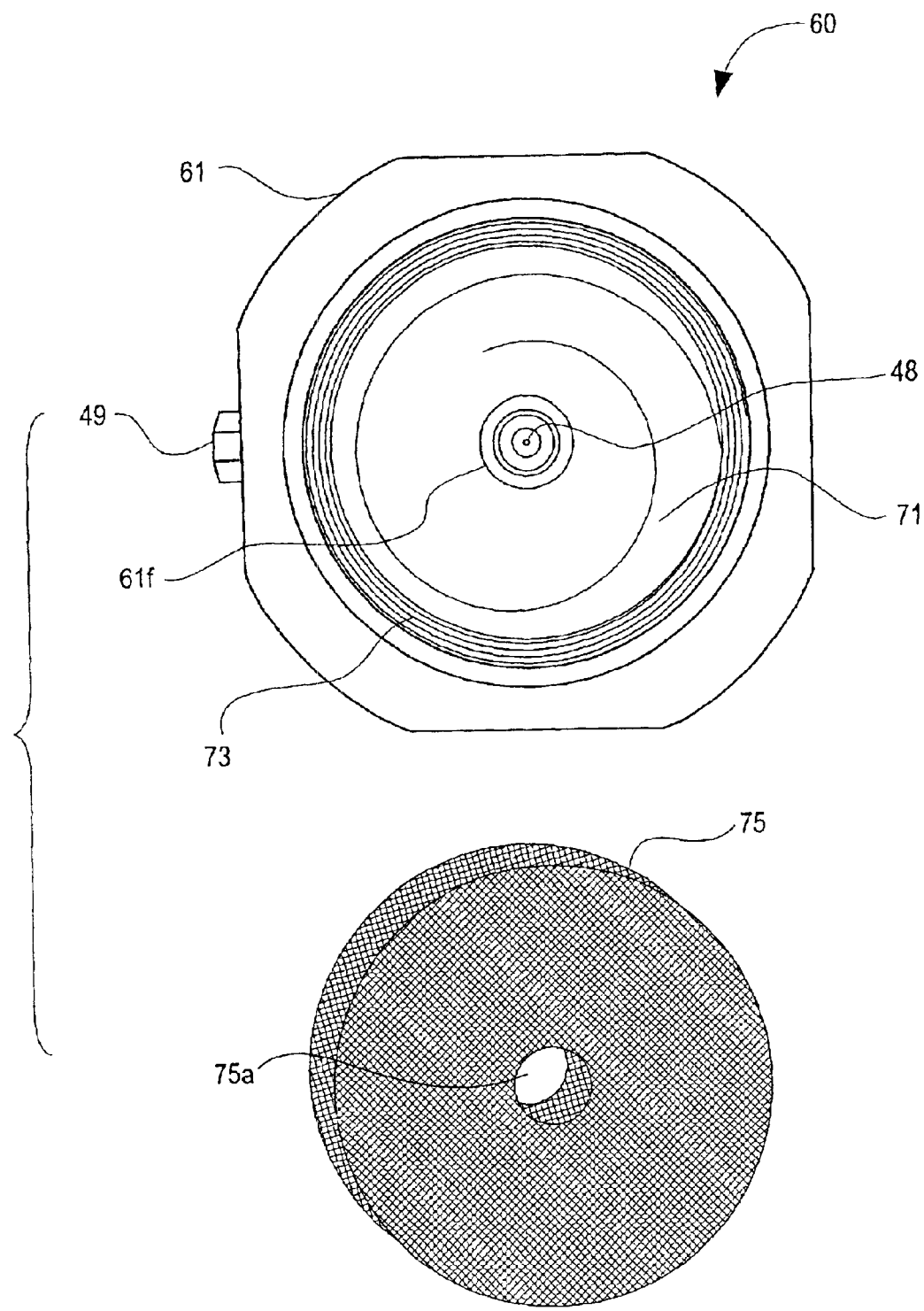
FIG. 3g is an elevational view of the distal end of the mixing chamber of the burner of FIG. 3d.

In the present embodiment body 61 is formed with a shoulder 61b leading to a neck 61c having threadings 61d. A flame jet-forming ring 66a is provided, as shown in FIGS. 3e and 3f, having jet forming openings 66 and a holding collar 66b. Collar 66b of ring 66a may be seated onto the rim 61e of body 61 and retained by holding ring 67. Ring 67 comprises internal threadings which cooperate with threadings 61d of body 61 to hold ring 66a onto body 61. Within body chamber 61, it will be seen, emerges fluid atomizer tube 68, though opening 61f in bottom element 61a of body 61. A mesh screen roll 73, preferably constructed of a roll of tightly woven metal mesh, is provided at the perimeter of the interior wall of mixing chamber 71. A covering 75, also created of tightly woven metal mesh in the preferred embodiment, is provide, having an opening 75a defined therein, through which atomizer tube 68 may emerge. In a preferred embodiment, two layers of covering 75 are provided.

Atomizer tube 68, as shown in FIG. 3e, is further provided with an atomizing head 65, which allows the atomized particulate to be sprayed out of atomizer tube 68 in a desired manner, well known by persons having skill in the art, and a holding collar 69 to hold head 65 onto atomizer tube 68.

Figure 3H:
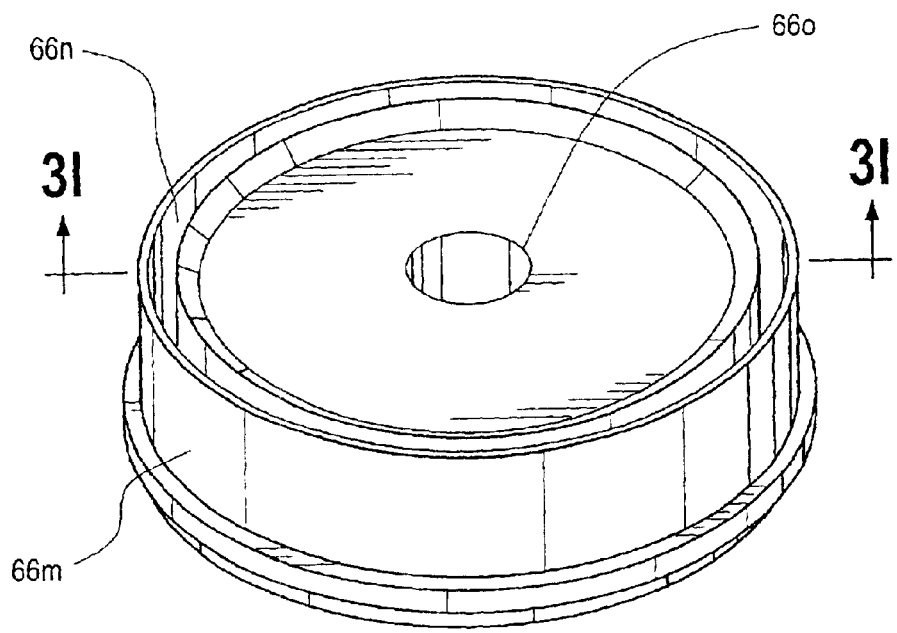
FIG. 3h is a perspective view of an alternative distal piece for the burner of FIG. 3d.
Figure 3I:
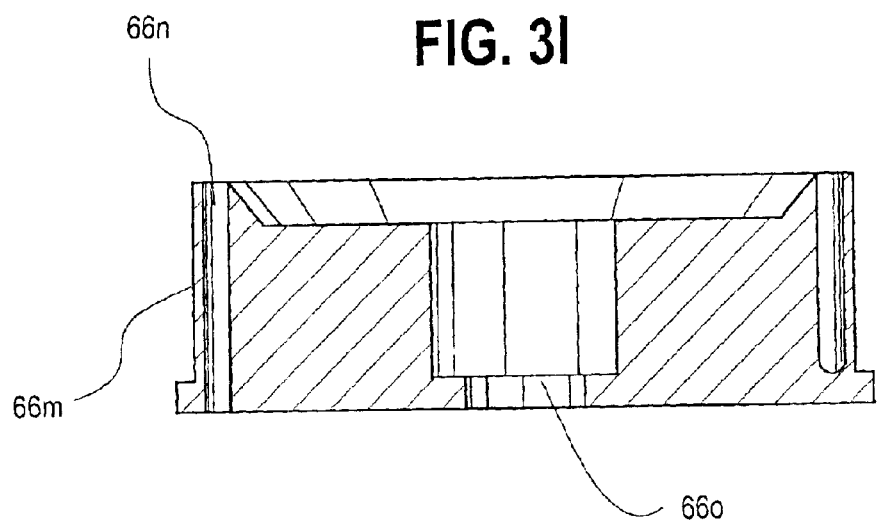
FIG. 3i is a cross-sectional view of the distal piece of FIG. 3h taken along the plane of line i—i of FIG. 3h.

Referring now to FIGS. 3h and 3i, an alternative jet-forming ring 66m is shown. As illustrated, the jet forming opening 66n of ring 66m comprises a continuous opening, allowing a more potent flame to emerge. Ring 66m includes an opening 66o through which atomizer 48 can emerge.

Figure 4:
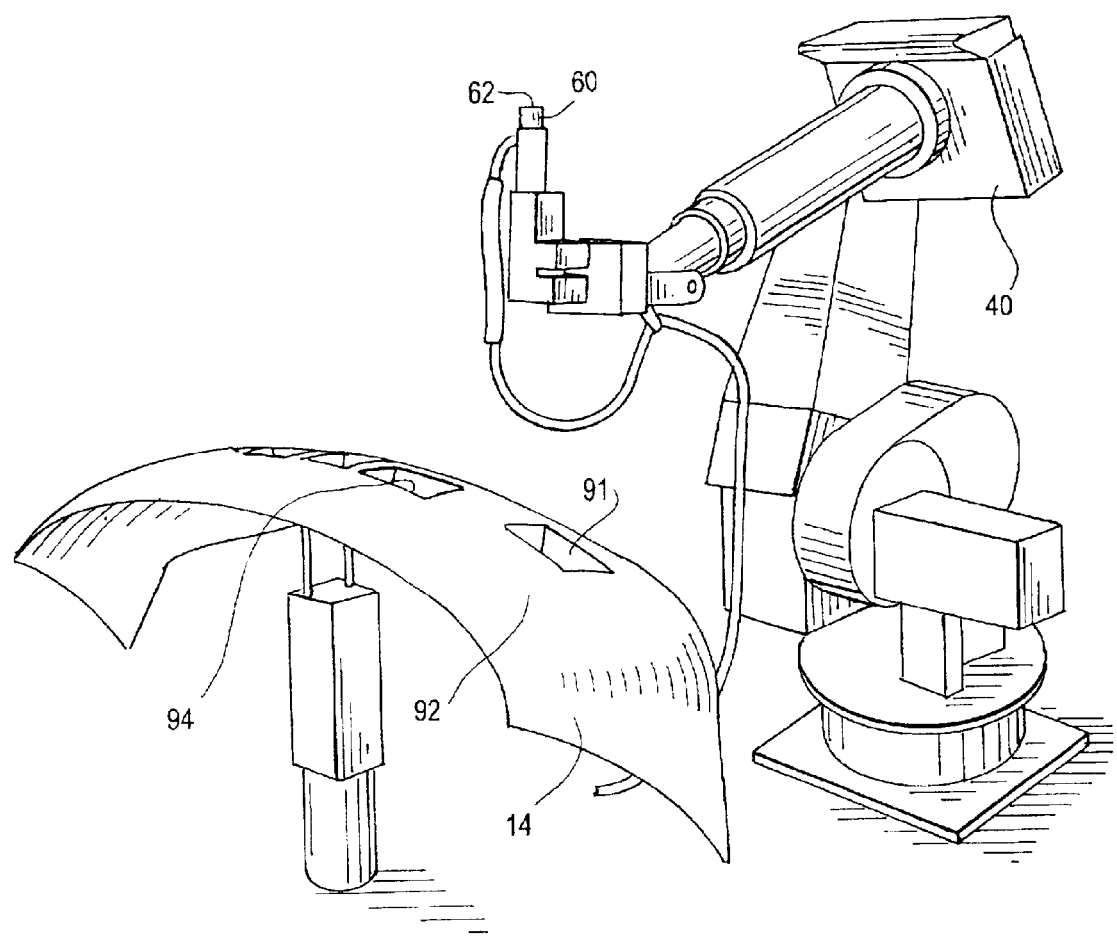
FIG. 4 is a perspective view of an item to be treated by a device of the present invention.

Referring to FIG. 4, a burner 60, having a flame area 62, of the present invention may be seen in position on a robotic device 40. Item 14, here illustrated as an automobile bumper 14, is shown in position to be treated. As shown, bumper 14 comprises a plastic material having indentations 90, undulations 92 and openings 94, among other topographical features. In order to prepare such a bumper for painting, all of the irregular topographic features must be properly treated and prepared for paint. As illustrated in FIGS. 5–10, burner 60 of the present invention may be manipulated so that flame area 62 can cover any topographic feature of bumper 14. FIG. 6 shows the shape of flame area 62 in a first ignited position.

Figure 5A:
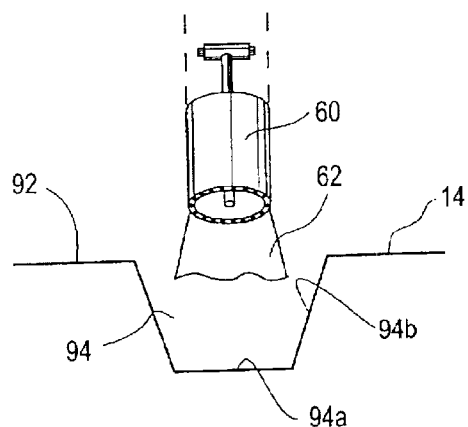
FIG. 5 is a series of diagrammatic views of the device of the present invention in use on an contoured item to be painted.
Figure 5B:
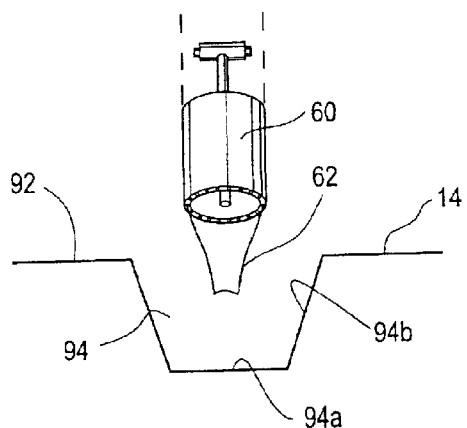
Figure 5C:
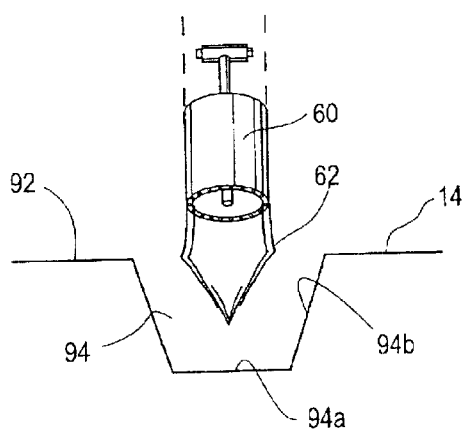
Figure 5D:
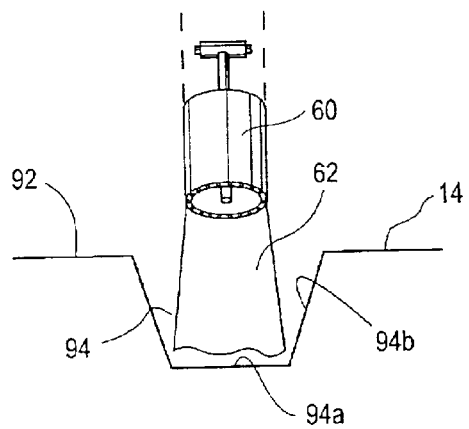

In the treatment of plastic parts, the burner is adjusted to fit the size of the area to be treated. It is to be understood that flame area 62 may be adjusted, using controls that specifically cause more or less propellant 47 at higher or lesser pressures, as is most widely recognized in the use of Bunsen burners in laboratories. Specifically, when covering flat areas (FIG. 5a and FIG. 7) flame area 62 may be made to burn with a widened flame, by decreasing propellant 47 pressure, so as to cover large areas rapidly. In the treatment of openings 94, or crevices or other topographic features of item 14, flame area 62 may be adjusted by increasing and then decreasing propellant 47 pressure. FIGS. 5b and 5c, illustrate the narrowing of flame area 62 to allow the flame tongue 63 to enter a narrow crevice 94. Once flame tongue 63 reaches the bottom 94a, of opening 94, propellant 47 pressure can be decreased causing tongue 63 to widen such that the inner surface 94b of opening 94 is touched by flame tongue 63. It is to be understood that control of the narrowing and widening of flame tongue 63 can be accomplished using electronic controller 52, such that a single accurate pass of all surface area portions of item 14 are made.

As flame tongue 63 is drawn upwards out of opening 94, flame tongue 63 licks the entire inner surface 94b of opening 94. Grafting chemicals 46, or other fluids 46, are atomized and cover the freshly oxidized surface as flame tongue 63 is withdrawn.

In accordance with a further exemplary aspect of the present invention, colored fluids 46c are injected into burner 62 such that as grafting chemicals are placed onto item 14, item 14 may be colorized so that the operators and workers can easily recognize which items have been treated. In a preferred embodiment, of this aspect of the present invention, a quantity of propylene glycol and a quantity of a suitable colorizing agent (such as red die no. 55) is mixed with a quantity of a water/graft chemical mixture in a ratio of 250 parts mixture to 1 part propylene glycol and 1 part colorizing agent. It will be appreciated by, those having ordinary skill in the relevant art that chemicals other than those specifically identified above may be used in connection with this aspect of the present invention disclosed herein.

In accordance with another further exemplary aspect of the present invention, electrolytic chemicals are injected into burner 62 such that as grafting chemicals are placed onto item 14, item 14 receives a small ionic charge, which will allow the subsequent painting of item 14 by electrostatic means. In a preferred embodiment of this aspect of the present invention, a quantity of a suitable electrolyte such as potassium citrate, sodium chloride, or sodium citrate is mixed with a quantity of a water/graft chemical mixture in a ratio of 10 ml (mili-liter) of electrolyte for each liter of mixture. It should be understood that other electrolytes can be utilized to allow the surface of the substrate plastic parts to be made at least partially conductive.

The present invention disclosed herein provides significant advantages over conventional systems that utilize adhesion promoters to treat substrate plastic parts to accept paint. For example, one gallon of a typical adhesion promoter is capable of treating approximately forty (40) plastic bumper fascias, whereas one gallon of the graft concentrated chemical when mixed as disclosed herein is capable of treating approximately 12000 of such bumper fascias. Furthermore, the present invention allows the time associated for treating each substrate plastic part to be significantly reduced. For example, a plastic bumper fascia can be fully treated to accept paint in approximately forty (40) seconds in accordance with one embodiment of the present invention disclosed herein.

In accordance with a further development of the present invention disclosed herein, a robotic flame treatment apparatus may be used to spray materials other than graft chemicals such as, for example, a powder. One example of such a powder material is chopped fiberglass mixed with a low density powder. In this case, a burner is controlled to move in a predetermined fashion over a mold so that so that the chopped fiberglass is sprayed through the flame and powder mix onto a mold and at least partially hardened by the flame provided by the burner as discussed in greater detail hereafter. This allows, for example, the manufacturing times for fiberglass articles such as, for example, rowboats and pleasure craft to be significantly reduced. In motor vehicle applications of this aspect of the present invention disclosed herein, a number of different motor vehicle components such as, for example, high strength, low weight, thin gauge body panels to be manufactured.

Figure 11:
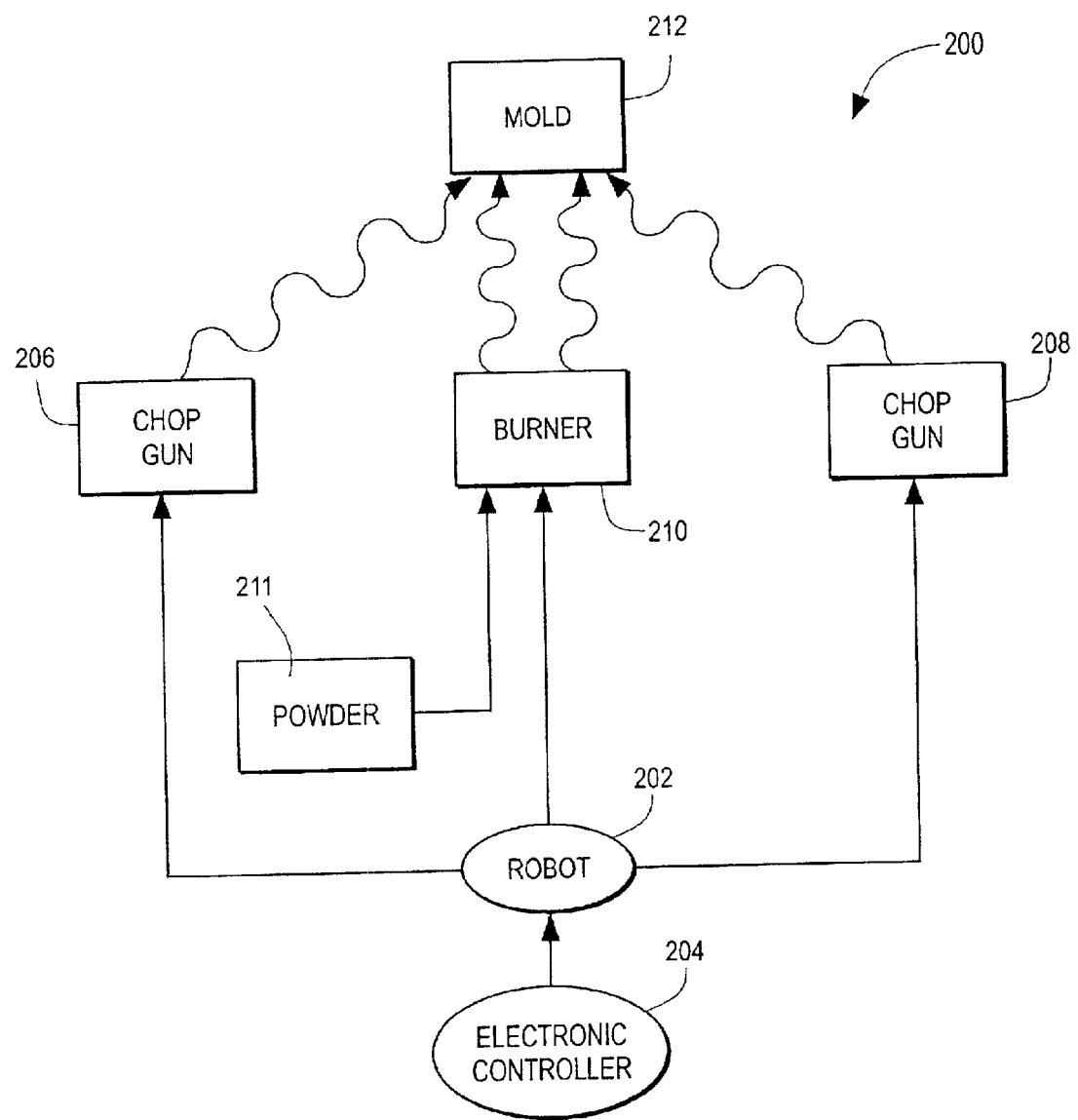
FIG. 11 is a schematic view of an apparatus that is used to manufacture glass fiber preforms.

Referring to FIG. 11, a schematic diagram of method of manufacturing glass fiber preforms is illustrated. In particular, a robotic flame treatment apparatus 200 includes a robot 202, an electronic controller 204, two chop guns 206 and 208, and a burner 210. The electronic controller 204 is programmed to cause the robot 202 to move the burner 210 and the chop guns 206 and 208 in a predetermined sequence relative to mold 212 to manufacture a glass preforms as discussed in greater detail hereafter.

The robotic flame treatment apparatus 200 generally includes the same structure as the robotic flame treatment station 18 shown in FIG. 1, except as discussed in greater detail hereafter. Instead of using a center atomizing tube together with an atomizer, a ½" tube through the housing of burner 210 is used. The tube is secured with a lock nut at the top of the burner 210 adjacent the face of burner 210. A nozzle is fit inside this tube that is compatible with spraying powder 211.

At the bottom of burner 210, a ⅜" polyethylene tube is connected. This tube is configured as a powder/air delivery line. Furthermore, the nitrogen/fluid delivery system is removed and replaced with a typical auger driven powder delivery pump. This unit requires compressed air to be connected into a venturi which in turn is fed with a constant supply of power through a frequency driven motor on the auger. The net result of this structure is a constant ratio of powder in a given air stream.

With this process, it is important to control the flame temperature to prevent the powder that is sprayed from burner 210 from burning up in the flame. For this purpose, a flame treatment system (not shown) that is similar to the flame treating system 50 (FIG. 2) is operatively connected to the burner 210. The flame treating system includes a gas/air control system and an oxygen analyzer. The oxygen analyzer allows an operator to monitor and maintain the accuracy of the flame so that the flame temperature remains constant.

For example, if it is desired to "chill" the flame, the amount of combustion air used in the primary gas/air mix is increased. This causes the flame temperature to be decreased, but will be shown as an increase in oxygen content on the oxygen analyzer. Conversely, if it is desired to increase the flame temperature, then the amount of combustion air used in the primary mix is decreased, which will be shown as a drop in oxygen content on the oxygen analyzer. Set points and control loops can be set within the control panel to maintain optimum performance as readily apparent to those of ordinary skill in the relevant art.

The burner system is designed to be automated in use and mounted to a robot arm for articulation. In particular, the burner 210 is mounted on an end effector plate of an arm of robot 202. The chop guns 206 and 208 also are mounted on this end effectuator plate. Chop guns 206 and 208 are designed to produce a predetermined amount of chopped glass fiber or carbon fiber strands per unit time. The chop guns are powered by compressed air and function in a manner similar to an air driven motor. A small amount of air is also used to provide "fan" air to the outgoing chop, and thus give it shape in a manner similar to a spray pattern. Changing this small amount of air, either by pressure or volume will change the shape of the fan pattern.

In the illustrated embodiment of the invention, chop guns 206 and 208 are mounted on either side of the burner 210, 180° apart from the burner 210 and angled towards a center intersect point. The center intersect point, which is the point in space relative to the burner at which the chop streams will merge together, is adjustable relative to the required output measured in pounds of chop/minute.

The apparatus discussed above can be used to manufacture various articles as discussed in greater detail hereafter. In one exemplary application of the present invention, the glass or carbon fiber is chopped at a given rate by chop guns 206 and 208, and merges together at a distance of approximately 6–12 inches from the face of burner 210. The flame is ignited and adjusted in output relative to the required lay down rate of the chop. Through the center of burner 210, a powder is "sprayed" therefrom towards the center intersect point of the chop guns 206 and 208. This powder can be, for example, a low molecular weight polyester resin, a high molecular weight polyester resin, a low molecular weight epoxy resin, or a high molecular weight epoxy resin. The choice of resin used will depend on the complexity of the pre-form being laid up together with the strength requirements required within the component.

Spraying the powder through the flame created by the burner 210 causes the powder to become "tacky" from the heat transfer with the flame. Once tacky and now inside the velocity stream of the flame, the "tacky" powder is carried to the intersect point with the glass chop and becomes mixed with the chop. This effect covers the surface of the chop material and allows the formation of a "mat" without fear of strands of fiber chop either sagging or blowing off from the surface of the pre-form. The electronic controller 204 is programmed to provide multiple layers of this slurry to build the required pre-form thickness and loft.

Figure 12:
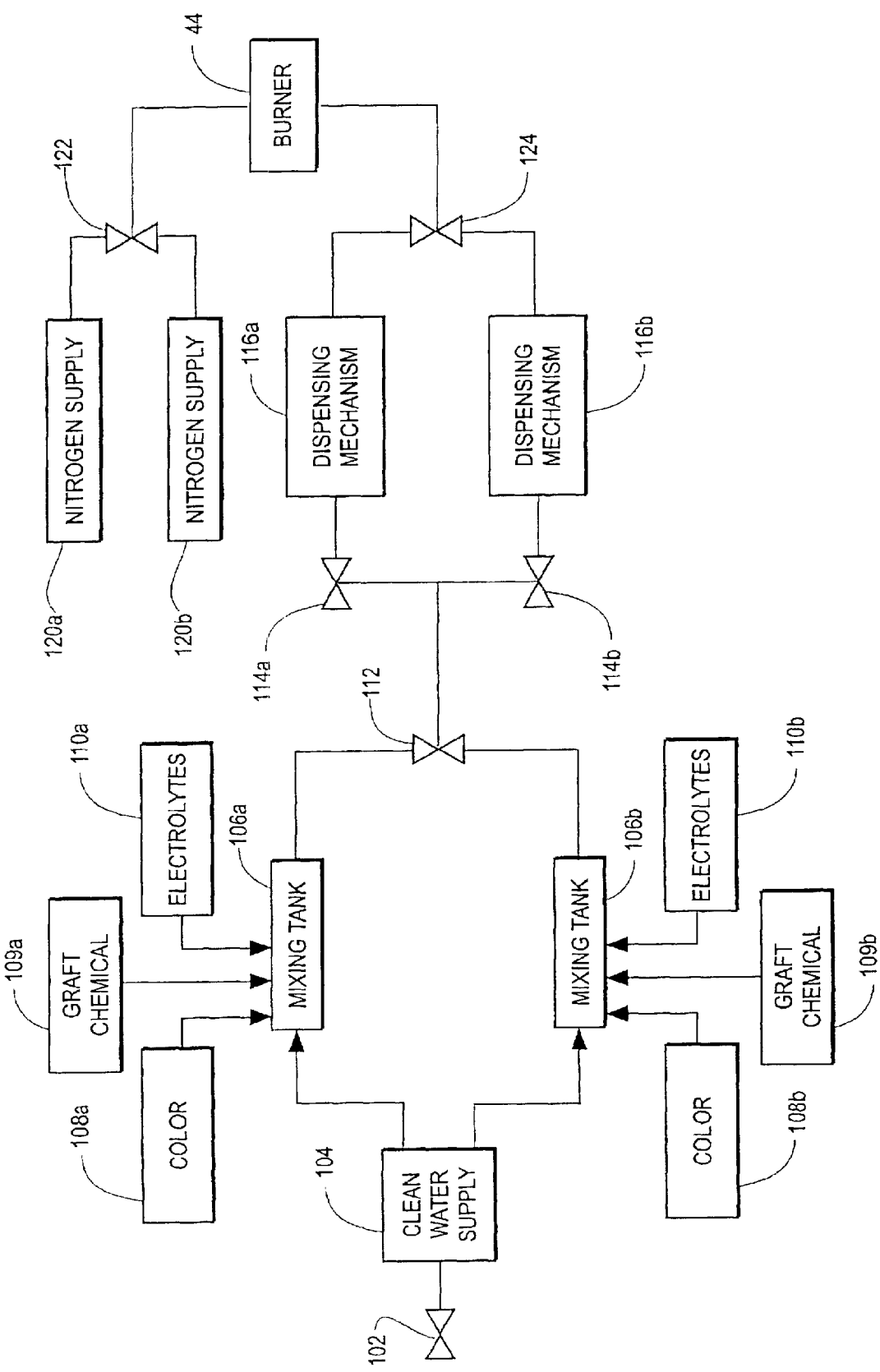
FIG. 12 is a schematic representation of the fluid preparation and delivery system of a preferred embodiment of the present invention.

Referring now to FIG. 12, a preferred embodiment of a scheme 100 for mixing, preparing and delivering fluid to the robotic flame treatment device 18 of the present invention is provided. In the scheme 100, a valve 102 is provided to allow a clean water supply 104 to flow to the 170 system then into one of two mixing tanks 106a and 106b. It will be understood by persons having skill in the art, that the present scheme 100 provides certain redundancies, as will be explained as the description continues, to permit the scheme 100 to proceed in spite of the failure of parts of the scheme 100. In a preferred embodiment, two mixing tanks 106a and 106b, of a type well known in the art, are provided so that should the first mixing tank 106a fail, or be undergoing general maintenance, the scheme 100 of the present invention can continue to be practiced. Mixing tank 106a is connected to a color tank 108a, to an electrolytes tank 110a, and to a graft chemical tank 109a. Mixing tank 106b is connected to a second color tank 108b, to a second electrolytes tank 110b, and to a second graft chemical tank 109b.

In the operation of mixing tanks 106a and 106b, clean water from supply 104, and graft chemical from supply 109a or 109b, respectively, (and, if desired, color from color supplies 108a or 108b, as well as electrolytes from supply 110a or 110b, respectively) are drawn or pumped into mixing tanks 106a and 106b, respectively, in desired quantities. Means to mix, of any type known to persons having skill in the art, contained or made part of mixing tanks 106a and 106b, cause the color, electrolytes and graft chemical water to be mixed to a desired mixture. The desired mixture is then moved from mixing tanks 106a and 106b, respectively, to valve 112 to dispensing mechanism 116a and 116b, through intermediate valves 114a and 114b respectively. It will be understood that while a 3-way solenoid and a 3-way valve are shown in the Figures, other types of valves and solenoids can be used without departing from the novel scope of the present invention.

Concurrently, nitrogen supply tanks 120a and 120b are provided, filled with nitrogen gas 121. Pressurized nitrogen gas, as explained above, is a preferred propellant for use in the device of the present invention. As explained above, and in association with FIG. 3B, propellant 47 can be injected into the burner 60 to cause atomizing of the grafting chemicals and other fluids 46 to be propelled onto the plastic item 14 to be so treated. As shown in FIGS. 3B and 12, nitrogen 121 and the desired mixture of color, electrolytes and graft chemical, are sent, independently, to supply valves 122 and 124 and are, in a predetermined manner, supplied to a spray burner 44, wherein the desired mixture is propelled and atomized, by the nitrogen 121, onto the item 14 selected to be treated.

It will be seen that the scheme 100 of the present invention can be practiced in association with a control system 130, as shown in FIG. 13. Control system 130 includes at least the following elements: a CPU 115, which can take the form of a microprocessor (not shown) and memory 133; a flame control unit 114; a robot controller 112, each of which can be, for example, a variety of different microprocessors with memory and other electronic components which are well known in the art. Control system 130, may further comprise a modem 138, a display unit 140 and data input means 142 (including any one or more of a key board, card reader, scanner, scanning device, UPC code scanner and/or mouse). Control system 130 further includes data communication means 144 connecting control system 130 to each of the clean water supply 104, mixing tanks 106a and 106b, color supplies 108a and 108b, graft chemical supplies 109a and 109b, electrolytes supplies 110a and 110b, dispensing mechanisms 116a and 116b and nitrogen supplies 120a and 120b.

Persons having skill in the art will recognize that an industrial computer, such as an Allen Bradley industrial computer having a Micro View operator display on the front of the panel, or other similar computer device, can be used without departing from the novel scope of the present invention. Each element of control system 130 is connected to communications means 144 in manners well known in the art, including by various types of well known computer communications means including USB connections, SCSI connections, Infra Red connections, Blue Tooth connections, serial cable connections and parallel cable connections and other connections known in the art.

Referring to FIGS. 15, 16, 17 and 18, a number of systems are shown and will be described, hereinafter, and that a number of the systems shown comprise redundancies. It will be understood by persons having skill in the art that while typically, a redundancy comprising one more unit is shown and described throughout this description, and in the accompanying drawings, any number of redundant units may be used, and such units need not be equally redundant (for example there can be 3 redundant propellant tanks and only one redundant water tank in a system) for each element of the invention, without departing from the novel scope of the present invention. Further, while the redundancies have been shown to be of equal capacity in the figures, it will be understood that different sized (for example a 30 gallon water tank is to be considered a redundant tank for a 20 gallon tank and vice-a-versa) tanks, storage means, conduits, sensors, valves and other elements may be used, and considered to be adequate and desirable redundancies, without departing from the novel scope of the present invention.

Figure 14:
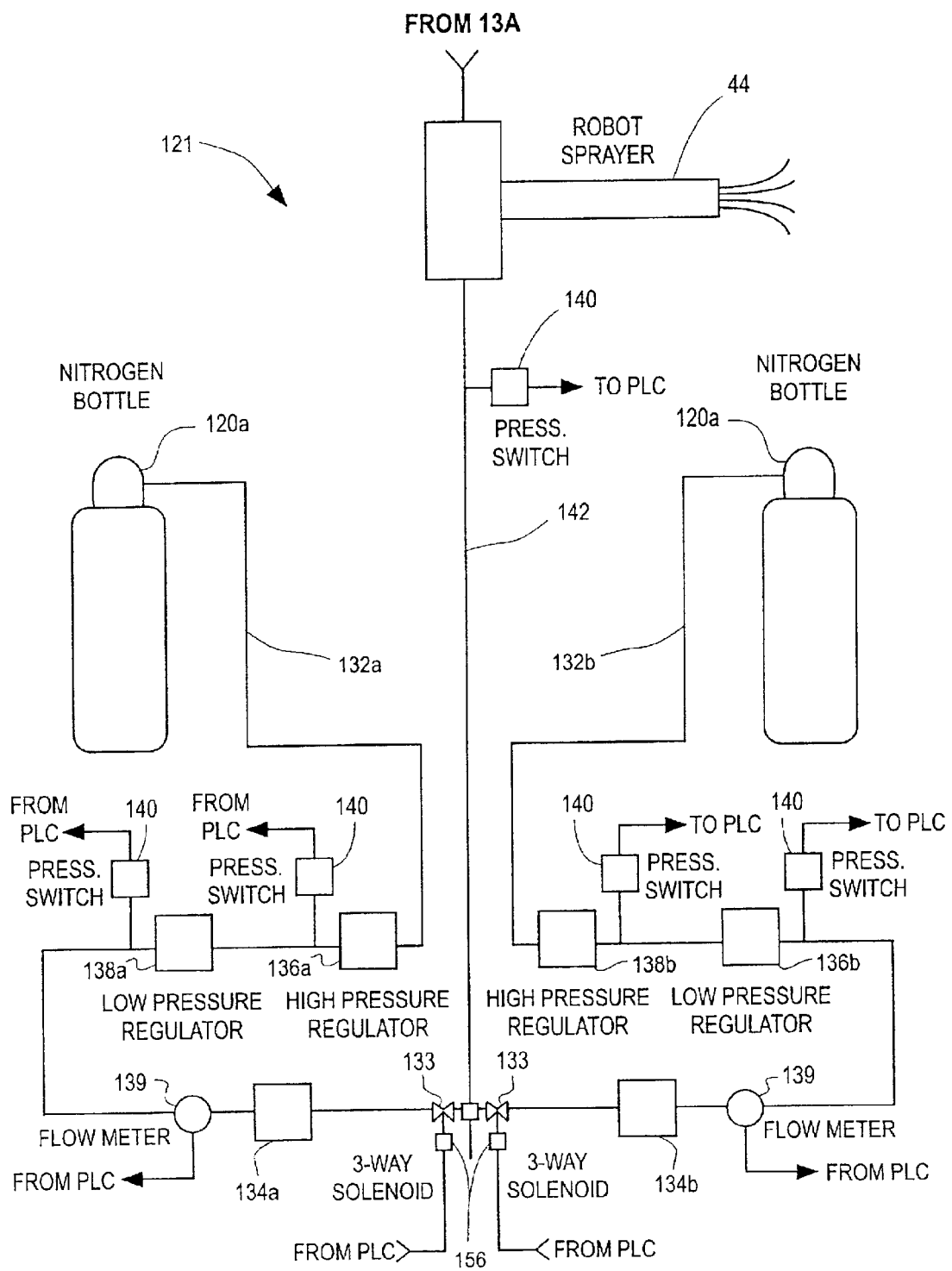
FIG. 14 is a schematic representation of the nitrogen supply system of a preferred embodiment of the present invention.

Referring now to FIG. 14, a representation of the nitrogen supply 121 system, as used in FIG. 12, is shown. As was indicated in the discussion of FIG. 12, a system having several redundancies is provided. It will be understood by persons having skill in the art that the number of redundancies provided and explained in this description have been made in order to accomplish a number of goals. Primary among the goals is the goal that a system made with such redundancies will not have elongated periods of idleness as a result of breakdown, normal maintenance or supply. With duplicate lines of supply breakdowns on one set of lines can typically be repaired while work continues using the alternate line. Exhausted supplies can be replenished while the redundant supply is in use and maintenance on machinery, supply tubes and line and canisters or other volumetric holding systems can be made without interfering with the operation of the various devices. It will be understood by persons having skill in the art that such a system of redundancies can be made as shown or with a variety of modification and manners without departing from the novel scope of the present invention.

Tanks 120a and 120b are attached in parallel to lines 132a and 132b, which comprise means both to permit flow 133a and 133b of pressurized nitrogen gas, or any other propellant used in the present invention, and means 134a and 134b to communicate the status of tanks 120a and 120b and the means to permit flow 133a and 133b. It will be understood by persons having skill in the art that means to permit flow (133a and 133b) can be any type of conduit including PVC or copper tubing or tubing made of any material having similar desirable properties, reinforced flexible tubing or any other type of conduit having similar desirable properties know to persons having skill in the art. Further, it will be understood, by persons having skill in the art, that means 134a and 134b to communicate the status of both tanks 120a and 120b and the flow means 133a and 133b, can be of any type of sensor and communicating means, including pressure, temperature, volume and weight sensors and can be in the form of wire or wireless communication devices.

Referring again to FIG. 14, it will be seen that tanks 120a and 120b are, eventually, attached to the robotic sprayer 40 and burner 44. However, in order to insure a desirable flow of pressurized nitrogen gas, or other propellant, to burner 44, lines 132a and 132b include a number of sensor and pressure devices such as those shown in FIG. 14. These devices can include, a high pressure regulator 136a and 136b and a low pressure regulator 138a and 138b having pressure switches 140 placed, respectively up and down stream of the high and low pressure regulators, at a number of locations along the path of the propellant gas. The pressure switches providing data concerning the volume and pressure of the propellant along lines 132 to a computer or other monitoring device, which is described above, and shown in FIG. 13, and will be described in greater detail below. Flow meters 139 can also be included along lines 132 so as to measure the flow of nitrogen gas 121 (or any desirable propellant gas) through lines 132. Flow meters 139 allow controller 112 to confirm the presence of gas within lines 132. It is understood by persons having skill in the art that pressure may often be present without flow, flow meters 139 will allow control system 130 to verify the presence of desired gas, and upon the detection of no flow can cause the redundant gas systems to be energized to provide the necessary propellant.

It will be seen in FIG. 14, that redundant propellant gas supplies are joined together, by means of valves 133, of a type well known in the art connected to sensors 156 (of the type previously discussed), to a single feed line 142. A pressure switch 140 is provided on feed line 142 to provide feed back to the monitoring system of the status of the propellant gas in feed line 142 as it approaches burner 44.

Figure 15:
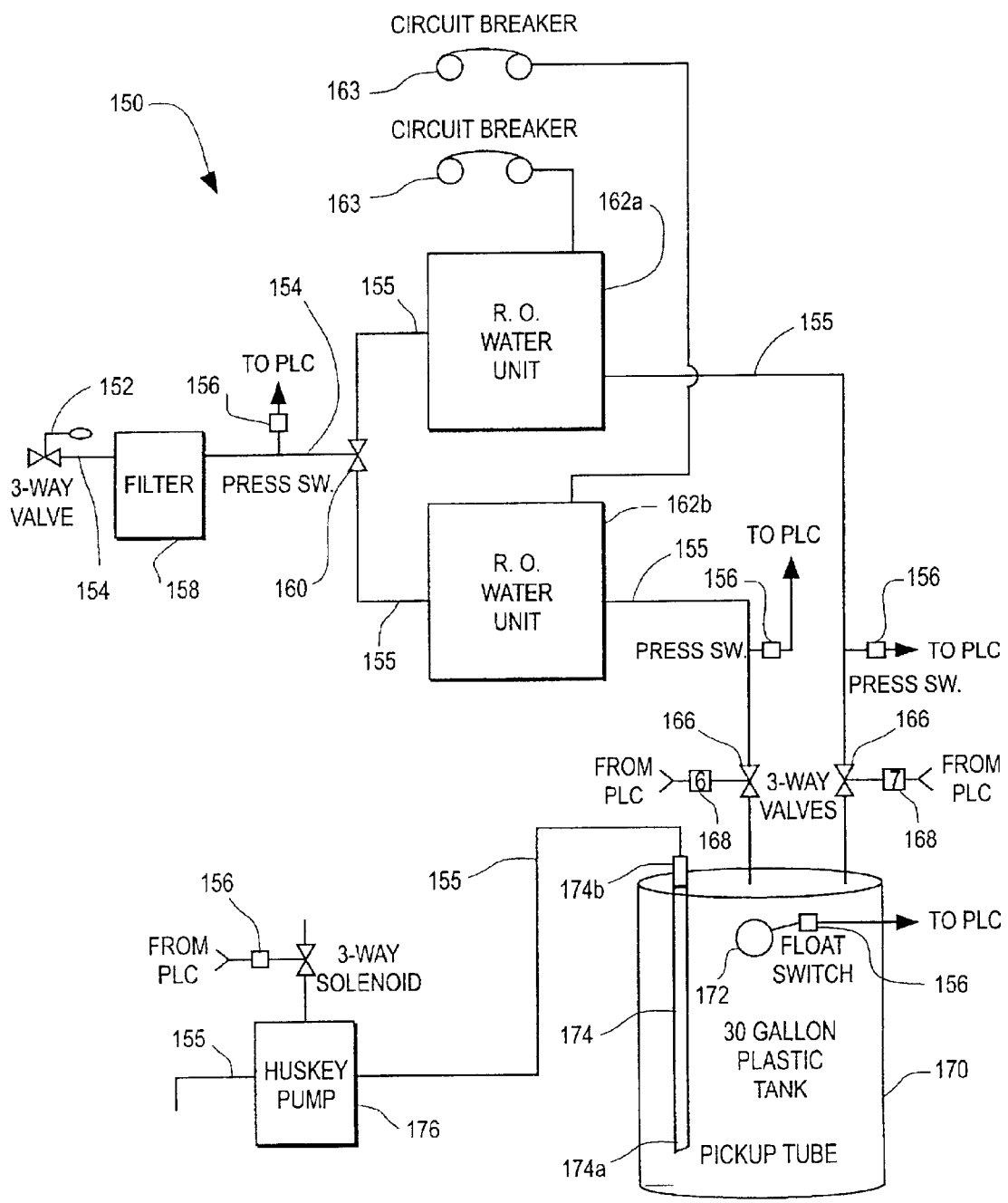
FIG. 15 is a schematic representation of the clean water supply system of a preferred embodiment of the present invention.

Referring now to FIG. 15, a water supply purification and storage system 150, comprising equipment for production and storage of clean water, used in the preparation of the graft chemicals of the present invention, is shown. A valve 152 connecting a source of water supply, such as that provided from a municipality, to the water supply purification and storage system 150 is shown attached to a conduit 154, of any type capable of carrying a water supply, and preferably of a type which provides a means to transport water without adding leached elements or contaminants, such as pipes made of PVC or other plastic materials or copper piping. In a preferred embodiment of the present invention, conduit 154 is provided with sensor elements, such as the pressure sensors 156 shown in FIG. 15. It will be understood, by persons having skill in the art that the addition of sensor elements is optional in a water treatment facility and that such a facility can be made with no sensors, or more sensors than those shown in FIG. 15, without departing from the novel scope of the present invention.

Water passing through conduit 154 is passed through an initial filter 158 of a type well known in the art, for removing suspended particles, colors, odors and other contaminants typically found in municipal and other water systems including potable water systems. After passing through the initial filter 158, the pressure of the water is measured, by sensor 156 and the measurement is reported, through means well known in the art, to control system 130 (FIG. 13), as the water continues in conduit 154 to a valve, preferably a "T" type valve, 160. Valve 160 is provided to again present a redundant system for water purification. Valve 160 allows the filtered water to proceed, through conduits 155, to two separate reverse osmosis treatment stations; RO stations 162a and 162b. It will be understood by persons having skill in the art that RO stations 162a and 162b, each having a circuit breaker 163, tying the station to electricity, are used to remove metals and other poisons and contaminants from the water supply, in a manner well known in the art.

Water emerging from RO stations 162a and 162b travel through conduits 155, past sensors 156, which report pressure in conduits 155 to control system 130, and into a storage tank 164. In a preferred embodiment, valves 166, capable of closing off flow from conduits 155 to tank 164, is provided on conduits 155 near storage tank 164. In a preferred embodiment, each valve 166 is provided with means 168 allowing communication between control system 130 and valves 166, such that a controller, at system 130, can open or close one or more conduits 155 as desired.

As can be seen in FIG. 15, a tank for storage of purified water 170 is provided. In one preferred embodiment, tank 170 is a 30 gallon plastic water-tight storage tank, it will be understood that any tank, of any size and material, capable of holding a desired amount of purified water, without effecting the purity of the water, can be substituted without departing from the novel scope of the present invention. It will also be understood that, with a system having a sufficient size and capacity, purified water can be created and used as needed, without the requirement of storage, without departing from the novel scope of the present invention. It will also be understood, by persons having skill in the art, that, while it is desirable to make a supply of purified water, purified water, having desirable qualities, can be purchased and used in the system of the present invention, without departing from the novel scope of the present invention. Typically, a redundant water tank will be found unnecessary, however, it will be understood that providing a redundant water tank for the present application will not be understood to be a departure from the novel scope of the present invention. In a system in which purified water is either produced as needed or purchased, a redundant water tank can be utilized to afford the protection of an emergency supply of water.

In order to monitor the supply of purified water a float switch 172, attached to a sensor 156 is provided within tank 170. In the operation of float switch 172, should the level of water in tank 170 fall below a desirable level, ball 172a will sink and cause switch element 170b to send a signal, through sensor 156, to the control system 130, on display unit 140, to indicate a low fluid level. A pickup tube 174 is provided in tank 170 to allow purified water to be removed from tank 170 and utilized to create the desired graft chemical, as will be explained in detail below. Pickup tube 174 can be made in any useful manner, however, in a preferred embodiment, pickup tube 174 is an elongated tube, made preferably of PVC plastic or copper, or other stable material, and having its lower end 174a cut at a diagonal to the pipe's diameter, so as to provide an oval shaped inlet area.

In a preferred embodiment, the lower end 174a of pickup tube 174 is placed into tank 170, and is secured to tank 170, by means well known in the art, so that the lower end 174a of pickup tube 174 does not touch the bottom of tank 170. In this manner residue which may exist at the bottom of tank 170 is not taken into pickup tube 174 during the operation of the device of the present invention, as will be described below. Pickup tube 174 is attached, at its upper end 174b to a conduit 155, which is attached to a pump 176, which can draw purified water out of tank 170. It will be understood by persons having skill in the art that conduit 155 used between tank 170 and pump 176 can be of any desirable type, including those previously described, as well as conduit made of flexible materials, such as a hose, without departing from the novel scope of the present invention. Pump 176 can be of any type that can draw purified water and provide the water at a desirable pressure to the remainder of the device of the present invention. In a preferred embodiment, a sensor 156 is provided in association with pump 176 such that pump 176 can be monitored by the control system, and the pump operation can be displayed, if desired, on display unit 140. Purified water, is pumped, by pump 176, to mix tanks 180, as shown in FIG. 16.

Figure 16:
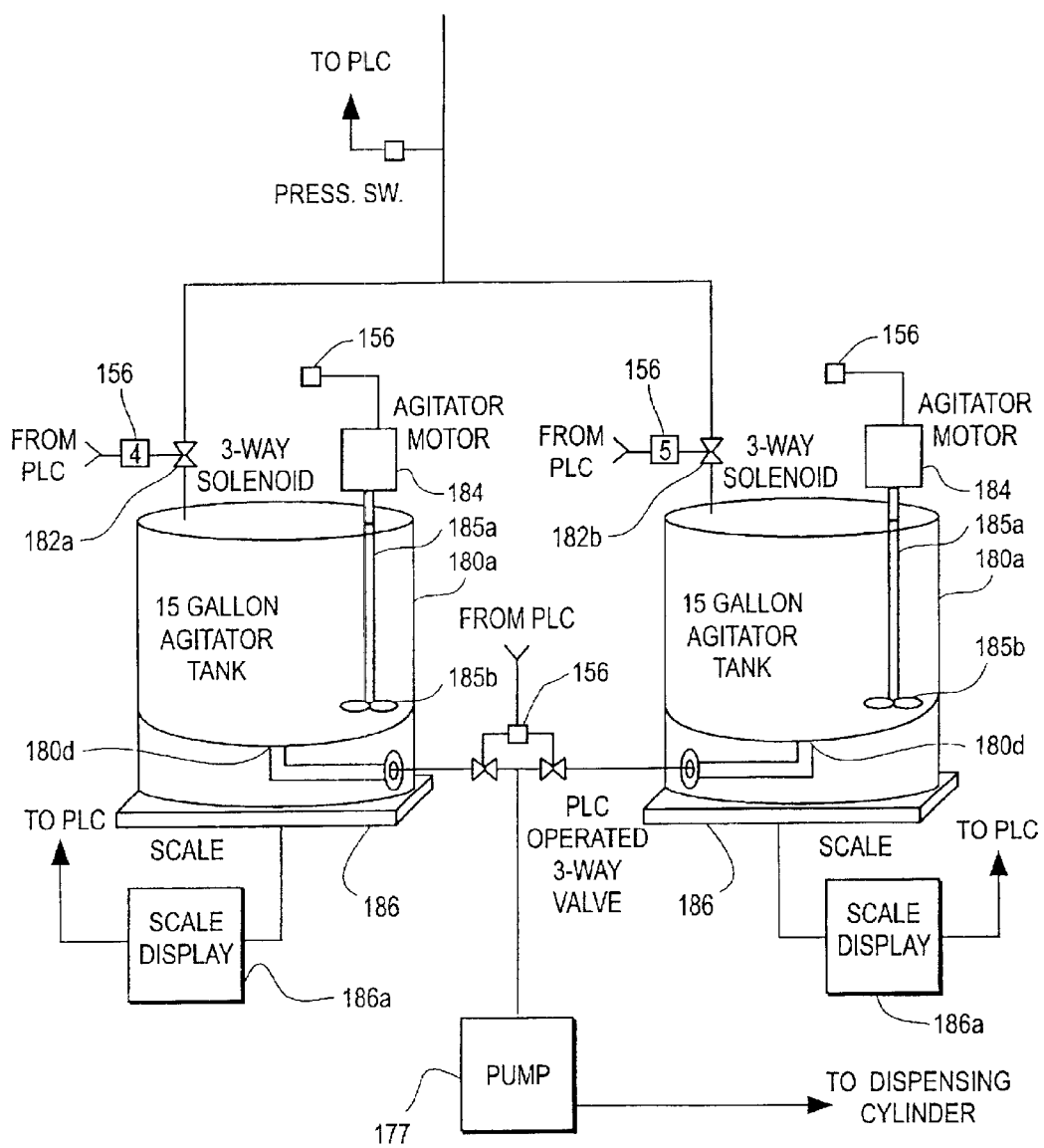
FIG. 16 is a schematic representation of the fluid mixing tanks of a preferred embodiment of the present invention.

Referring now to FIG. 16, the conduit 155 bringing purified water is provided with a sensor 156, connected to control system 130, which provides information to the operator of the system 130, with respect to the availability of purified water, downstream from the water purification system 150. Conduit 155 is then split such that purified water can be directed to at least two mix agitator tanks 180a and 180b. While mix agitator tanks 180 can be of any desirable shape and material, it will be understood, that in a preferred embodiment, each mix agitator tank 180 is made of a material that will not effect or be affected by the purified water or any chemicals therein, and are typically at least 15 gallons in size. Mix agitator tanks 180a and 180b are provided with water entry valves 182a and 182b respectively, each valve being attached to a sensor and actuator 156 allowing the control system 130 to maintain communication, cause purified water to be added to tanks 180a and 180b and to allow for the shut off of water to the tanks, in a manner such as previously discussed and which is know to persons having skill in the art. It will be seen later in FIG. 17 and as the description proceeds that tanks 180 are used in with respect to the addition of the graft chemicals, colorization elements and electrolytic elements described herein.

Agitation devices 184 are provided in each tank 180, and, in a preferred embodiment, comprise an electronically activated motor having an elongated shaft 185a and mixing element 185b. It will be understood by persons having skill in the art, that agitation devices 184 can take any form which will cause the desired agitation of chemicals and water as required by the processes of the present invention. Agitation devices 184 are further attached to sensor and activation devices, as used with other elements of the present invention, described herein.

As shown in FIG. 16, a preferred embodiment of the present invention includes drainage from tanks 180 through a hopper-like device 180d, such that agitated fluids are withdrawn from below the tanks 180. It will be noted that tanks 180, in a preferred embodiment, are each placed onto an electronic scale 186, which provides a unique means to measure the contents of tanks 180. Each scale is provided with a display device 186a and a connection between the display device 186a and the control system. By addition of known amounts of liquids and chemicals (in various states of matter) having known specific gravities and volumetric information, the addition of appropriate and desirable amounts of chemicals and water can be measured in accordance with the weight of the combination.

Appropriate valves, sensors and a pump are included to aid in withdrawing fluids and pumping them further along the path of the device of the present invention as will be described below.

Figure 17:
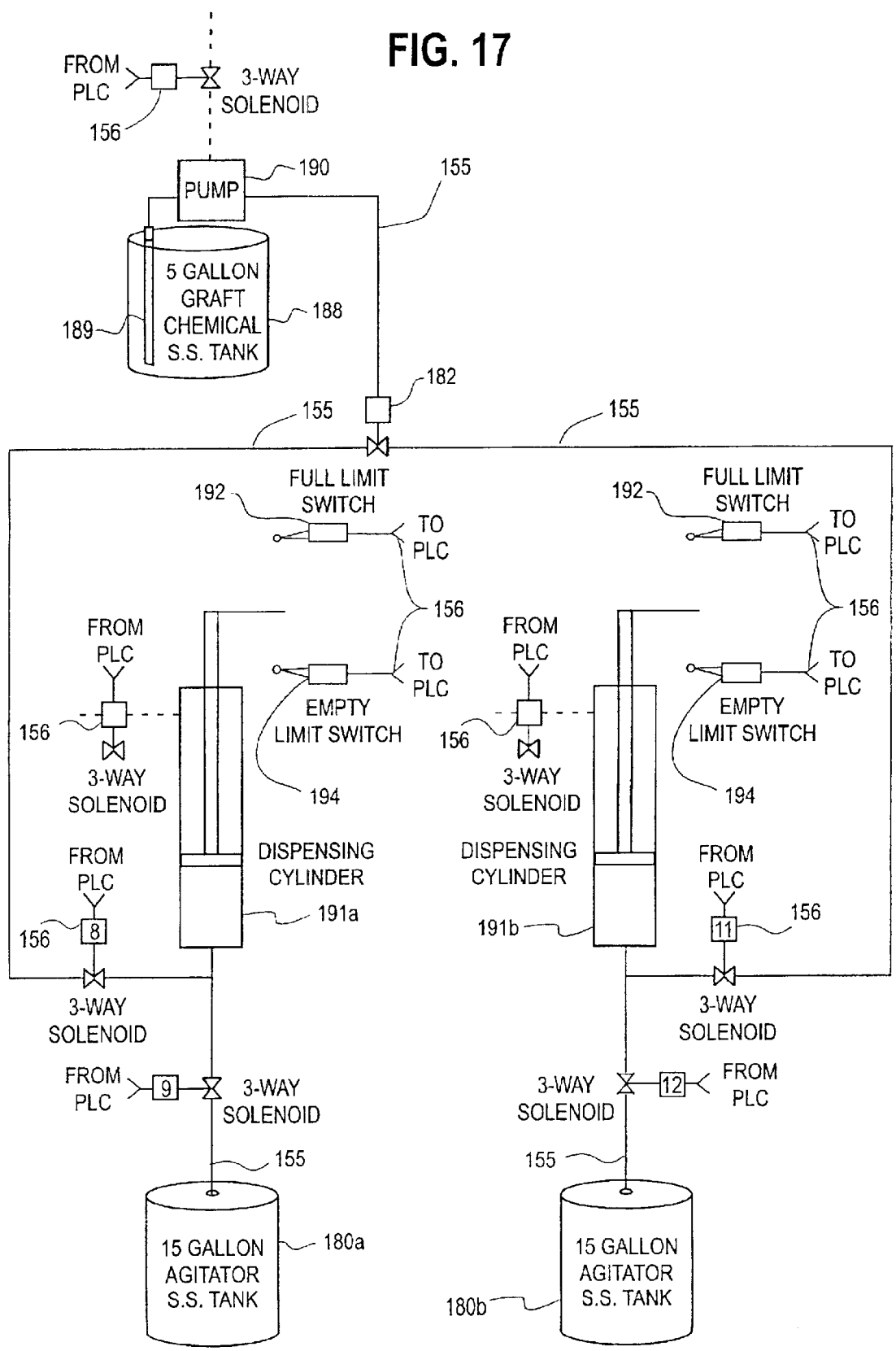
FIG. 17 is a schematic representation of an additive dispenser of a preferred embodiment of the present invention.

Referring now to FIG. 17, the addition of graft chemicals and other desirable elements are shown, in a preferred embodiment. It will be understood that the addition of chemicals is made into tanks 180, in a manner similar to that described with respect to the addition of purified water into those same agitator tanks 180. As can be seen a tank 188 containing a graft chemical is shown. It will be understood by persons having skill in the art that any type of tank, having desired properties, such as the ability to contain the grafting chemicals without being affected thereby, without departing from the novel scope of the present invention. A pickup tube 189, a conduit 155 and a pump 190 are provided as shown, all operating in manners similar to those previously described with respect to the water purification system described above. It will be understood by persons having skill in the art that modifications to these devices, in any manner that will allow a grafting chemical to be provided to the device of the present invention, can be made without departing from the novel scope of the present invention.

Monitoring systems providing the status of pump 190, conduit 155 and the grafting chemicals are provided, allowing monitoring at the control system 130 in such a manner as those previously described. While FIG. 17 shows a single graft chemical tank 188 and system, it will be understood, in light of the disclosure of the present invention, that a redundant graft chemical tank (or more than one) and systems may be provided within the scope of the present invention.

Once again, conduit 155 can be divided, as shown in FIG. 17, so that redundancies in chemical addition can be made. Graft chemical is added to conduit 155 such that it is subsequently deposited into one or more agitator tank 180. A valve 182 provides access of the graft chemical to the one or more agitator tank 180. Intermediate to agitator tank 180, as shown in FIG. 17, dispensing cylinder 191a is provided. In a preferred embodiment, a redundant dispensing cylinder 191b is also provided. It will be seen that dispensing cylinders 191 are provided with means to cause chemicals, contained therein, to be dispensed into agitator tank 180 through conduit 155. A full switch 192 and an empty switch 194 are provided, each having sensor means to allow the reporting of the condition of the dispensing cylinder 191 (either full or empty) are provided.

It will be understood that when the dispensing cylinder 191 is full, the full switch 192 will be activated, and as the dispenser empties, the empty switch 194 will be activated. The inclusion of redundancies in the present invention, allows the control system 130 to select a second dispensing cylinder having chemicals when it receives notice, from sensors 156, that a first dispensing cylinder is empty. Further, the use of three dispensing cylinders allows the inclusion of different chemicals to be added in different quantities to be added to agitator tank 180.

Figure 18:
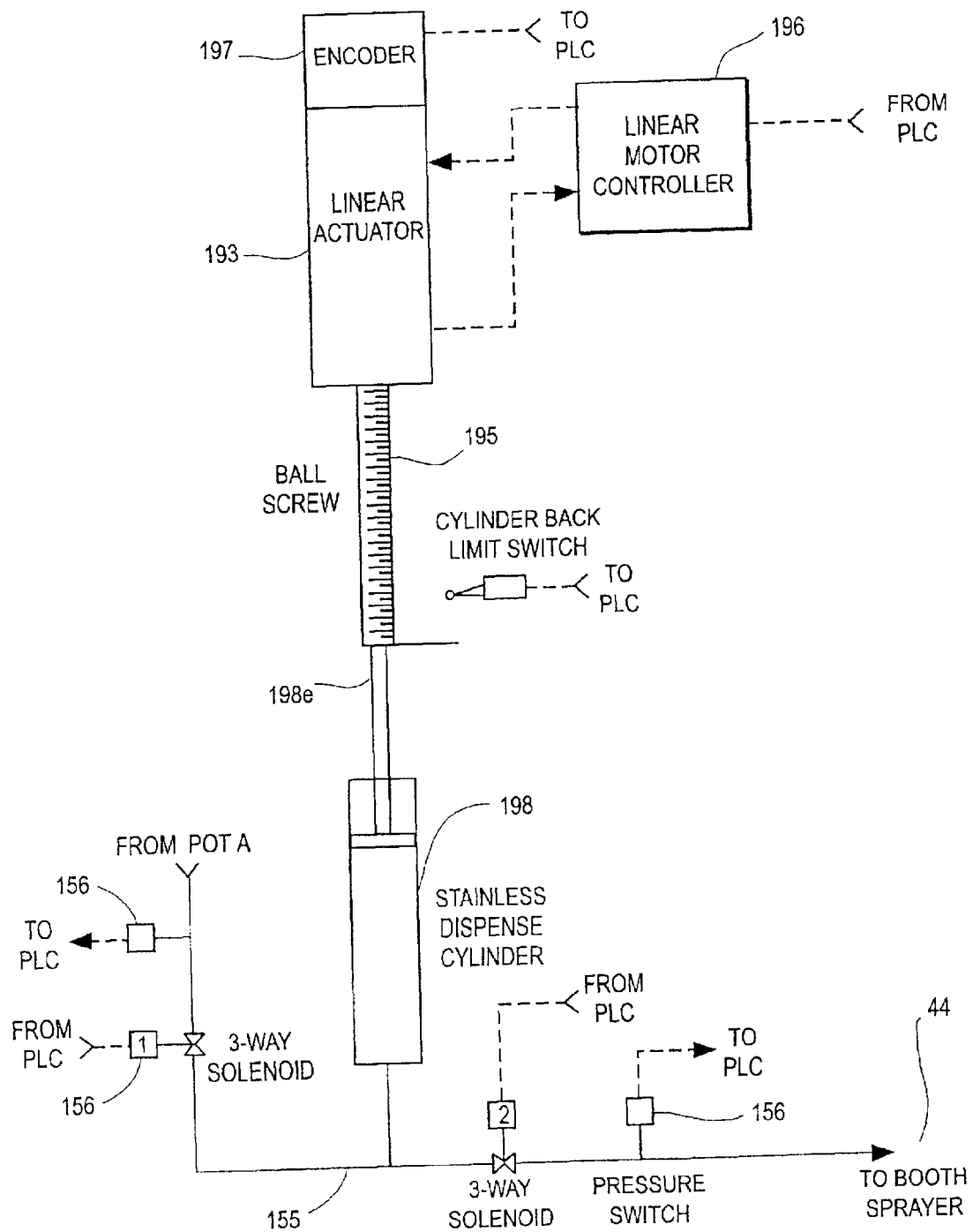
FIG. 18 is a schematic representation of an additive dispenser, for providing a desired chemical mix to the application element of the present invention.

Referring now to FIG. 18, a final dispensing cylinder 198, linking the mixed chemicals coming from agitator tank 180 to the robotic sprayer 44, is shown. A conduit 155 provides product from agitator tanks 180, including purified water, graft chemical, color solutions and electrolytes as explained in detail above. It will be seen that the actuation of the dispensing cylinder 198 can be electronically controlled using the following equipment: an encoder 197, a linear actuator 193, a ball screw 195 and a piston 198e in a manner well known in the art (and described in more detail below).

A linear motor controller 196 is actuated through a preprogrammed step, or by an added instruction given either by a local controller or a controller remotely located and using the Internet or other communications means. Encoder 197 is further connected to control system 130 so that control system 130 can control the operation of the linear actuator and subsequently the ball screw 195 and the degree to which piston 198e is depressed, releasing the mixed fluids (from agitator tank 180) to a conduit linked to a receptive portal in sprayer 44. It will be understood by persons having skill in the art, that information received at control system 130, from all of the sensors and reporting stations previously described, will be assessed and modifications to the chemical mix made, as needed, prior to such chemicals being directed to the sprayer 44.

It will be seen that the addition of the desired chemical mix from agitator tank 180 is sent along a final conduit 155 to the robotic sprayer 44, propellant is added to sprayer 44, in a manner discussed in detail above, and thereafter the chemical mix is propelled onto the item to be painted, in a manner previously described.

Figure 19:
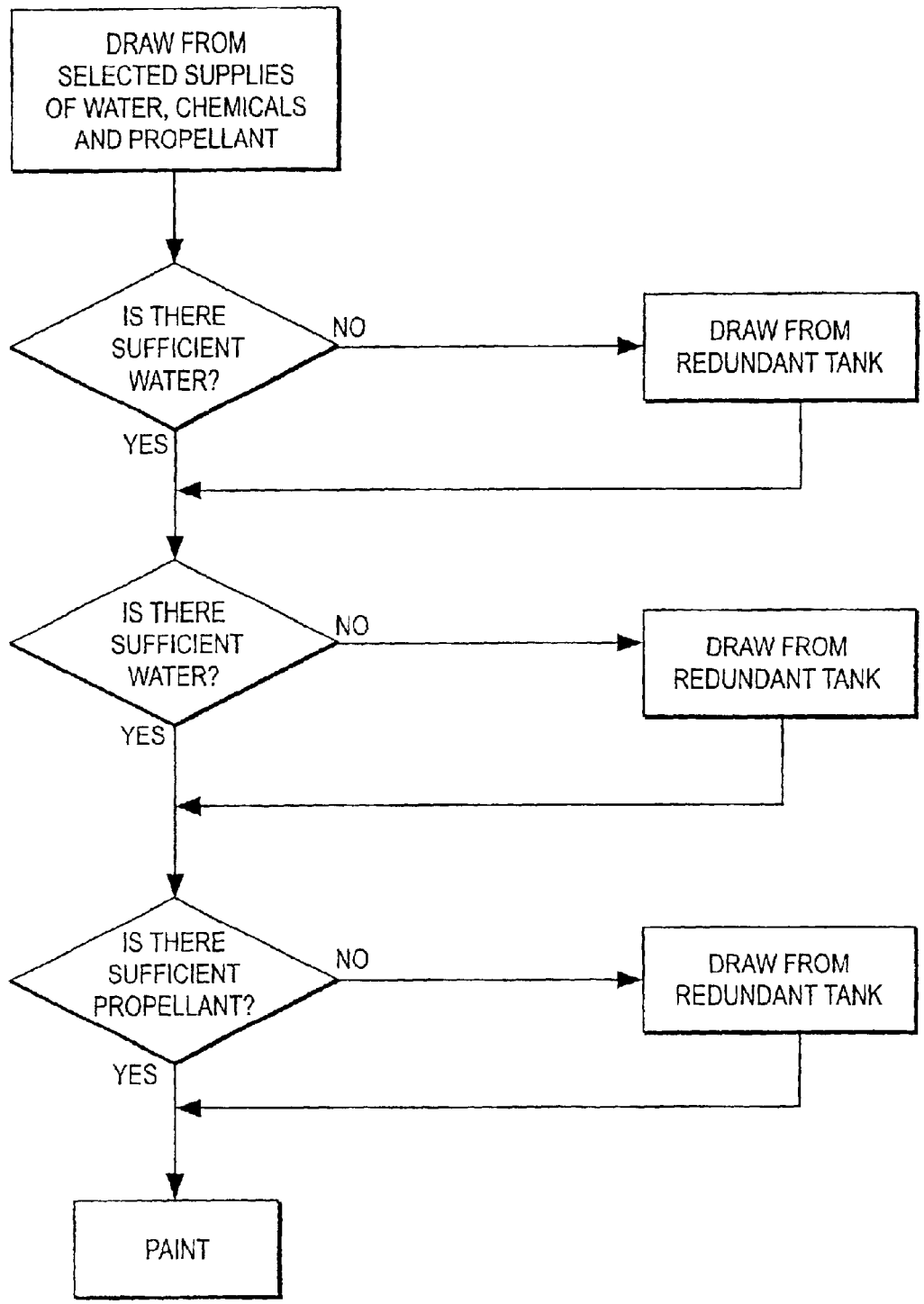
FIG. 19 is a flow chart of a preferred process of fluid delivery of the present invention.

Referring now to FIG. 19, use of redundant systems in the paint part process is explained. The steps of the process include providing the redundant systems shown in the figures, and for example, with respect to the chemical supply and propellant systems, 1) drawing from the selected dispensers and propellant, 2) deciding if the selected dispenser is below a threshold amount, 3) if the propellant is low, switching to the redundant tank, 4) if mix tank sensor reporting low volume, switching to redundant tank, 5) finish painting the part which was to be painted, as desired. It will be understood by persons having skill in the art that other methods, and/or steps to the disclosed method, of providing chemicals and propellant can be utilized without departing from the novel scope of the present invention.

Figure 20:
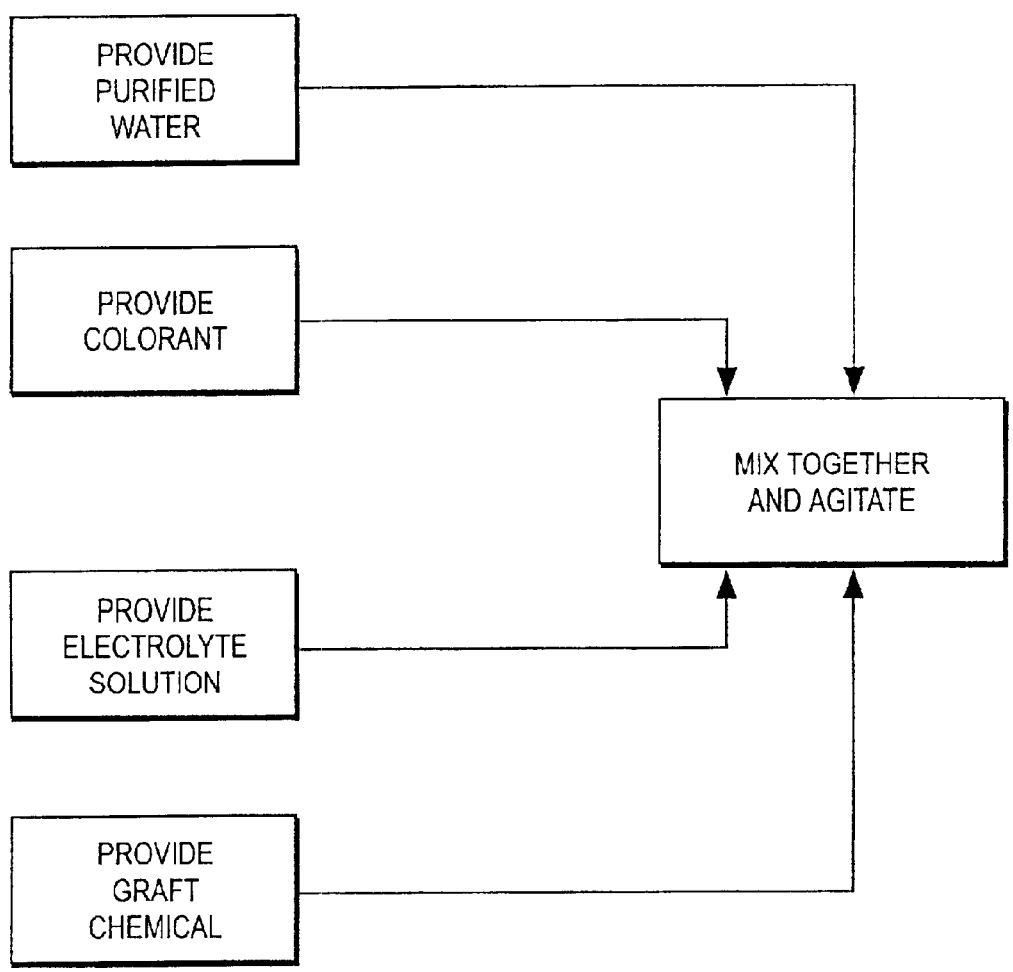
FIG. 20 is a flow chart of a preferred process of making a graft solution of the present invention.

Referring now to FIG. 20, the manner of making the solution to be applied is shown. The method includes the steps of: 1) providing predetermined quantity and quality of water, 2) providing a desirable amount of color solution, electrolyte material and graft material and 3) mixing the water and chemicals together. It will be understood by persons having skill in the art that FIG. 20 represents a simplified flow chart of a preferred method and that the details as discussed herein provide other explanations of the present invention. Further, it will be understood that other methods of providing purified water and chemicals can be utilized without departing from the novel scope of the present invention. Further, with respect to the process aspects of the present invention, it will be understood that different chemicals, different degrees of purity of water, different propellants (and/or no added propellants if desired) and different degrees of redundancies may be used without departing from the novel scope of the present invention.

Referring to FIG. 21, a schematic diagram of another preferred embodiment of the present invention is shown. It will be understood that in the interest of clarity, like numbers are used with respect to FIG. 21 as are used in the previous figures. Further, as in previous embodiments, it will be seen that redundancies are provided for a number of the systems described. It will be understood that the inclusion of redundancies for all elements of the present invention or fewer redundancies than those shown can be employed without departing from the novel scope of the present invention.

In the present embodiment, a clean water supply 104, preferably made by physically and/or chemically filtering municipal water, is fed to one or both reverse osmosis treatment units 162a and 162b, to provide a level of purity of water as previously described. Water of desired purity is then provided to one or both mixing tanks 106a and 106b. Simultaneously, electrolytes from electrolyte tanks 110a and 110b and coloring chemicals form color tanks 108a and 108b are provided to mixing tanks 106a and 106b. Grafting chemicals, as described above, from graft chemical tanks 188a and 188b are provided, using an intermediate dispensing units 116a and 116b to provided a desired measured quantity, to mixing tanks 106a and 106b. Further, a charge of nitrogen, from nitrogen tank 220 via regulator 222a (or from nitrogen tank 220b via regulator 222b) is provided to mixing tanks 106a and 106b to assist in the mixing process and to cause the pressurization of the mixed water, electrolytes, color and grafting chemicals so as to propel the mixture towards burner 44.

Control means 134a and 134b sense whether or not nitrogen flows from tanks 220a and 220b, and communicates this result to the control system.

Burner 44, described in greater detail above, is provided with a gas inlet 44a and a fluid supply inlet 44b, as well as a muzzle 44c through which a flame may emerge. It will be understood, from the previous description, that a means of igniting burner 44 is provided, in a manner well known in the art. Fluid is provided to burner 44, from mixing tanks 106a and 106b into fluid supply inlet 44b and propellant gas, in the present embodiment nitrogen, is provided to gas inlet 44a. When burner 44 is engaged, fluid is propelled through burner 44 by the nitrogen gas, while a controlled flame is used to prepare the object to be treated to accept paint.

It will be understood, by persons having skill in the art that the foregoing explanation of the process of the present invention is one preferred embodiment and that many modifications, as described in detail above, can be made without departing from the novel scope of the present invention.

Figure 23A:
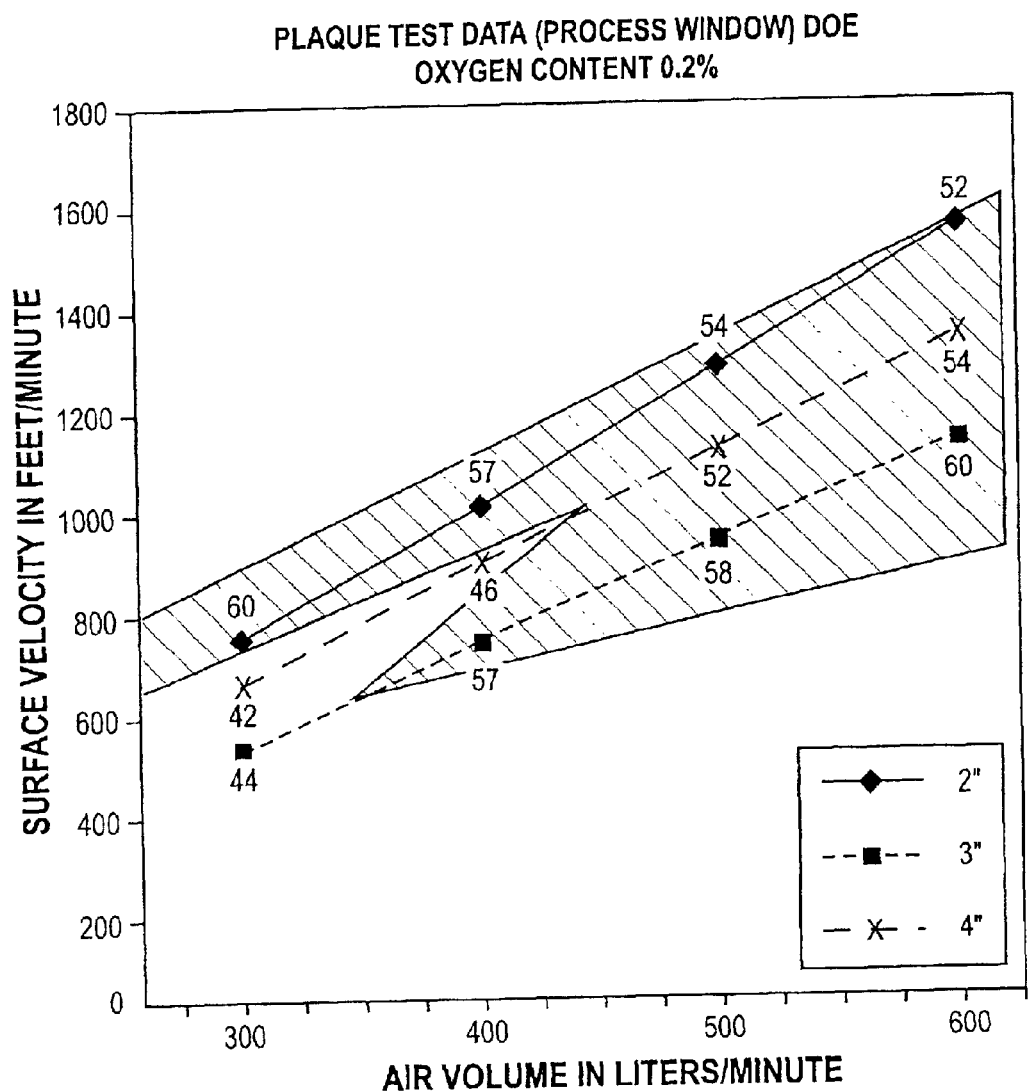
FIG. 23a is a graphic representation of information shown in the chart of FIG. 22; and, FIG. 23b is a graphic representation of information shown in the chart of FIG. 22.
Figure 23B:
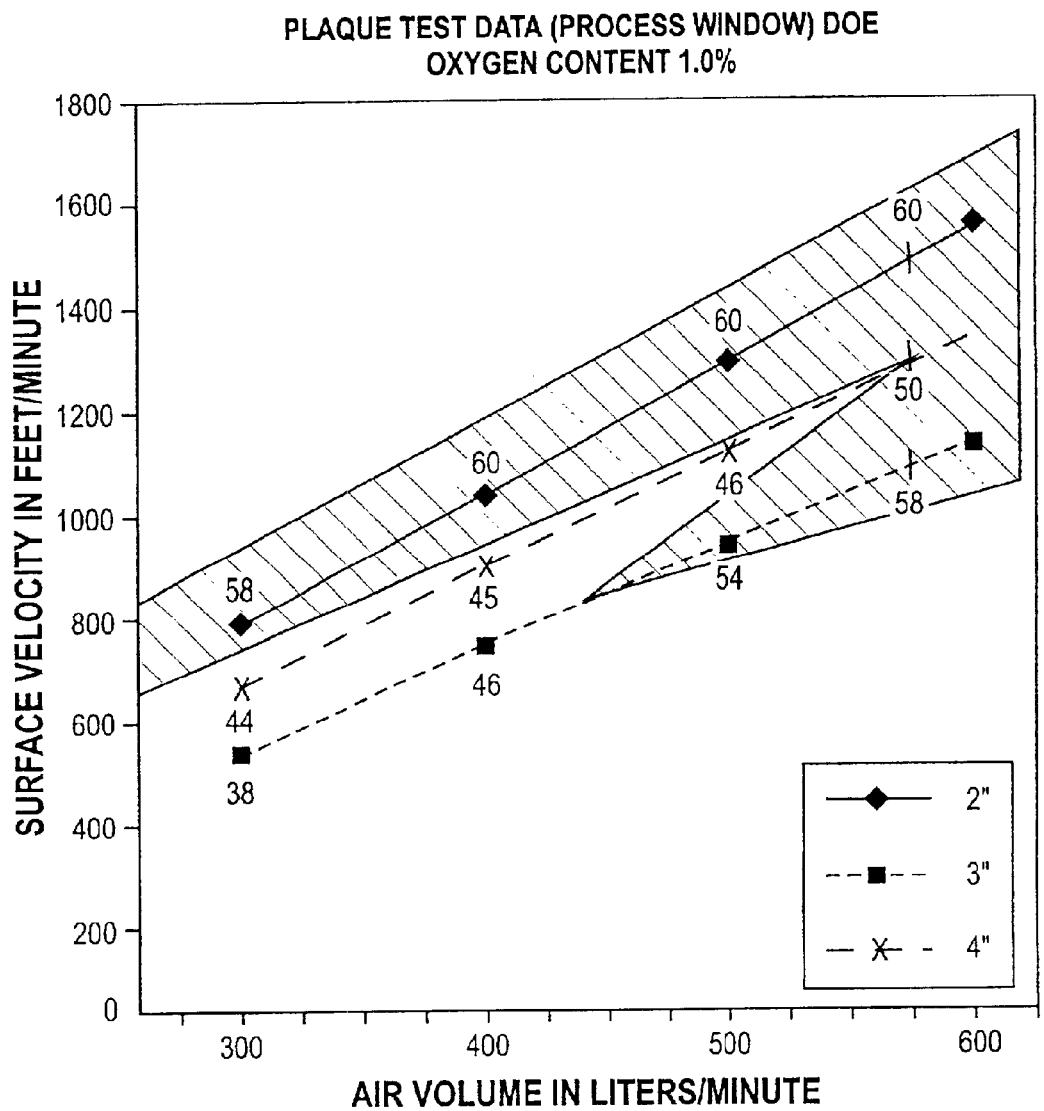

Referring now to FIGS. 22, 23a and 23b, a chart showing tests conducted on exemplary plaques, and graphs of test data, are shown. As will be understood by persons having skill in the art the tests were performed in order to simulate the actual method of the present invention and the devices, of the present invention, used to practice the method. It will be understood by persons having skill in the art that various modifications to the tests could be made without departing from the novel scope of the present invention and that the tests are shown to demonstrate the efficacy of the device and method and are not meant as limitations to the invention or its disclosure. Persons having skill in the art will understand the methods, units of measure and results shown in the context of devices and methods used and tests conducted.

The tests were performed as follows. A robot program was established to treat plaques of plastic material of approximately 4" by 6", in a consistent repeatable manner. The test provided for the placement of the plaque on an adjustable height apparatus, variable between 1" and 3" and placing that apparatus in a fixed position on a table. Two standard robot programs were established, the first at a 4" nominal distance from the burner face to the table surface and the second at 6" nominal distance from the burner face to the table surface. It will be seen that with these two configurations, any distance from 1" to 6" can be accommodated by the test jig.

The surface velocity readings, that is the velocity of the air/gas mixture on the surface of the plaque, were measured using a vane-type anemometer and centering the bulb of the anemometer exactly below the burner head face, whilst in a fixed position above the plaque surface. It will be understood that by following this method of velocity measurement, all readings will be comparable and consistent.

Throughout the test the air volumes were changed manually from within the flame treating system, and using the flow meter contained therein, displays of the volumetric control were made on the operator panel. The recorded results, as shown on the test data report, were then graphed and are shown on the chart of FIG. 22. The tests were conducted on Feb. 27, 2002.

Tests shown as parts 2, parts 3 and parts 4 on the test data report were then undertaken to establish the treatment level gained in units of dynes.

A plaque was placed on the bench at the required distance, for example 2, 3 or 4 inches. The flame was adjusted to the required volumetric output of air and then the gas was trimmed manually within the gas control cabinet, to give the required oxygen content as indicated by the oxygen analyzer. In the tests, a robotic arm, as described in greater detail above was used. The robotic arm traverse speed was at all times maintained as a constant. The robotic arm traversed the flame across the plaque and returned to its home position.

Surface energy levels were measured using surface tension inks applied with the use of cotton buds and in accordance with the ANSI standard. The initial surface energy of the material is shown in the report as being less than 32 Dynes. Surface energy data was then transposed onto the graph so that the operational process window can be drawn. A concluding surface energy level of greater than 50 dynes has been found to be desirable and can be achieved using the method of the present invention.

Referring to FIGS. 23a and 23b, process windows are shown. It will be understood by persons having skill in the art that the process window charts, and specifically those portions of the charts highlighted with hatched marks, will be useful in the field to allow for the accurate programming of the robotic arm. Data from tests, shown in FIG. 22, is placed on the process charts of FIGS. 23a and 23b, plotted so that air volume per minute versus surface velocity is graphed. In the illustrative embodiment, data points for an oxygen content of 0.2% are shown in one graph (FIG. 23a) and data points for an oxygen content of 1.0% are shown in another graph (FIG. 23b). It will be understood that persons skilled in the art may make modifications to the tests and the parameters used in the tests, without departing from the novel scope of the present invention.

The points, shown in FIGS. 23a and 23b, are plotted, and in the operation of the method of the present invention, once a person having skill in the art develops the process window for the material and conditions present and desired, then the programmer can program the robotic arm so that, for a given part-to-be-treated, having a particular shape, a program can be developed so that when the treatment, of the present invention, is progressing the conditions of the test are always within the parameters shown in the process window. The highlighted areas of the graphs of FIGS. 23a and 23b provide an area though which test parameters will lead to a surface energy of greater than or equal to 50 dynes and thereby provide desirable results.

Conclusions with respect to parts 2, 3 and 4 of the test, as demonstrated by the process windows, include that at 2" distance the treatment level drops off as the volume and velocity gets bigger; the oxygen content plays less of a role in achieving treatment; measurements of greater than 50 dynes can be achieved at low volumes and velocities; and material surface is inconsistent after treatment due to heat blushing of material additives.

As will be noted, the treatment window grows substantially as the oxygen content is reduced. It was apparent from the tests, and will be apparent to persons having skill in the art, that with increased oxygen content the treatment level gets smaller. Persons having skill in the art will understand that the lower the oxygen, with the use of the material tested, the larger the process window. The dynamics of the burner, for example the flame shape, has a big impact on the process window. It will be understood by persons having ordinary skill in the art, that the "treatment curve" will be predictable when using the burner of the present tests together with the features described.

It will be understood, from a study of the data shown, that an optimum treatment, will be achieved using the robotic arm at between 2" to 3" distance, from burner face to the surface of the material, using oxygen content of 0.20% per air flow output of approximately 450 L/min at a velocity of approximately 1100 ft/min. Use of these parameters, with a device and method as described and illustrated, should permit the user to have result in a treatment level of between 54 and 56 dynes. As noted above, these results represent an exemplification of a method of the present invention using a device of the present invention. It will be understood that many modifications to the devices and methods may be made, resulting in similar or different results, without departing from the novel scope of the present invention.

From the foregoing, it will also be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A gas burner assembly, comprising:
    a body portion having a chamber at least partially defined therein, an air/gas inlet that communicates with said chamber, and an open end that communicates with said chamber;
    a flame jet forming ring that is detachably coupled to said body portion to generally fully enclose said chamber, said flame jet forming ring including at least one port defined therein that, when said flame jet forming ring is coupled to said body portion, communicates with said chamber and is disposed in a predetermined relationship with respect to a longitudinal axis of said body portion;
    a first coupling member that is adapted to detachably couple said flame jet forming ring to said body portion so that when an air/gas mixture is fed into said chamber through said air/gas inlet, said air/gas mixture is generally evenly distributed throughout said chamber and said at least one port, and substantially all of all said air/gas mixture flows from said air/gas inlet to ambient atmosphere through said chamber and said at least one port;
    wherein said at least one port forms a generally enclosed shape so that when an air/gas mixture is projected therefrom and ignited, a generally enclosed flame is projected from said burner assembly in a direction that is generally parallel to the longitudinal axis of said body portion; and
    a second coupling member that is adapted to detachably mount said gas burner assembly on an end of arm tool so that when said gas burner assembly is mounted on an end or arm tool and projects a flame therefrom, said gas burner assembly can be moved in a desired pattern over a substrate to flame treat the substrate, said flame jet forming ring being detachable from said body portion without removing said gas burner assembly from the end of arm tool.

2. The gas burner assembly of claim 1 wherein said at least one port is generally parallel with respect to said longitudinal axis of said body portion.

3. The gas burner assembly of claim 2 wherein said at feast one port is parallel with respect to said longitudinal axis of said body portion.

4. The gas burner assembly of claim 1 further comprising a discharge tube having an inlet and an outlet, said discharge tube being oriented in a predetermined way with respect to said longitudinal axis, said outlet being generally peripherally surrounded by said at least one port.

5. The gas burner assembly of claim 4 wherein said discharge tube is generally concentric with said longitudinal axis of said body portion.

6. The gas burner assembly of claim 5 wherein said discharge tube is concentric with said longitudinal axis of said body portion.

7. The gas burner assembly of claim 5 wherein said discharge tube is generally parallel to said longitudinal axis of said body portion.

8. The gas burner assembly of claim 4 wherein said discharge tube is adapted to project an inert gas from its outlet at various velocities to allow the geometry of said enclosed flame to be changed in proportion to the velocity of the inert gas that is projected from said discharge tube.

9. The gas burner assembly of claim 1 wherein said first coupling member comprises a ring member.

10. The gas burner assembly of claim 9 wherein both of said ring member and said body portion include threads that correspond to each other to allow said ring member to couple said flame jet forming ring onto said body portion.

11. The gas burner assembly of claim 1 further comprising means for reducing the backflow of an air/gas mixture from said at least one port into said chamber.

12. The gas burner assembly of claim 11 wherein said means for reducing comprises a screen member that is adapted to fit a cross-sectional area of said chamber.

13. The gas burner assembly of claim 12 wherein said screen member is disposed in said chamber at said open end.

14. The gas burner assembly of claim 1 wherein said at least one port is generally circular in shape.

15. The gas burner assembly of claim 14 wherein said at least one port is generally concentric with said longitudinal axis of said body portion.

16. The gas burner assembly of claim 14 wherein said at least one port comprise a plurality of individual flame jet pouts each of which communicates with said chamber when said flame jet forming ring is attached to said body portion.

17. The gas burner assembly of claim 1 wherein said body portion and said flame jet forming ring are formed from a lightweight material to reduce the weight of said gas burner assembly and thereby minimize deflection of the end of arm tool when said gas burner assembly is mounted thereon.

* * * * *